(12) United States Patent
Kawasaki

(10) Patent No.: US 10,587,783 B2
(45) Date of Patent: Mar. 10, 2020

(54) IMAGE RECEPTION TERMINAL, IMAGE COMMUNICATION SYSTEM, IMAGE RECEPTION METHOD, AND RECORDING MEDIUM

(71) Applicant: OLYMPUS CORPORATION, Hachioji-shi, Tokyo (JP)

(72) Inventor: Shinya Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 11 days.

(21) Appl. No.: 16/106,418

(22) Filed: Aug. 21, 2018

(65) Prior Publication Data
US 2018/0359393 A1 Dec. 13, 2018

Related U.S. Application Data

(63) Continuation of application No. PCT/JP2016/055018, filed on Feb. 22, 2016.

(51) Int. Cl.
*H04N 5/067* (2006.01)
*H04N 5/232* (2006.01)
(Continued)

(52) U.S. Cl.
CPC .......... *H04N 5/067* (2013.01); *H04N 5/232* (2013.01); *H04N 5/23206* (2013.01);
(Continued)

(58) Field of Classification Search
CPC .... H04N 5/067; H04N 5/232; H04N 5/23206; H04N 7/063; H04N 7/18; H04W 72/02
See application file for complete search history.

(56) References Cited

U.S. PATENT DOCUMENTS 7,835,343 B1 * 11/2010 Reibel ............... G08B 13/1966
370/310
8,089,444 B2 * 1/2012 Kim ..................... G09G 3/3648
345/204
(Continued)

FOREIGN PATENT DOCUMENTS

JP 2006-217384 A 8/2006
JP 2010-284274 A 12/2010
(Continued)

OTHER PUBLICATIONS

International Search Report dated May 17, 2016, issued in counterpart International Application No. PCT/JP2016/055018, w/English translation (4 pages).

*Primary Examiner* — Amy R Hsu
(74) *Attorney, Agent, or Firm* — Westerman, Hattori, Daniels & Adrian, LLP

(57) ABSTRACT

An image receiving terminal includes a communicator and one or more processors. An elapsed time is a time period from a time point at which a vertical synchronization signal is generated to a time point at which a specific packet is received by the communicator. The processor sets a determination reference time on the basis of the plurality of measured elapsed times. The processor determines whether the communication channel which is used by the communicator is to be switched to another communication channel on the basis of the set determination reference time and the elapsed time measured after the determination reference time has been set. The processor controls switching of the communication channel which is used by the communicator on the basis of the result of determination of the communication channel.

10 Claims, 20 Drawing Sheets

(51) Int. Cl.
*H04N 7/18* (2006.01)
*H04W 72/02* (2009.01)
*H04N 7/06* (2006.01)

(52) U.S. Cl.
CPC .............. *H04N 7/063* (2013.01); *H04N 7/18* (2013.01); *H04W 72/02* (2013.01)

(56) References Cited

U.S. PATENT DOCUMENTS

| | | | |
|---|---|---|---|
| 8,156,238 B2* | 4/2012 | Kobayashi | H04L 65/4092 709/203 |
| 2002/0149617 A1* | 10/2002 | Becker | G06F 3/1454 715/751 |
| 2010/0118158 A1* | 5/2010 | Boland | H04N 5/23203 348/211.2 |
| 2012/0062715 A1 | 3/2012 | Endo et al. | |
| 2017/0055272 A1* | 2/2017 | Bando | H04W 72/02 |

FOREIGN PATENT DOCUMENTS

| | | |
|---|---|---|
| JP | 2011-109226 A | 6/2011 |
| JP | 2012-509639 A | 4/2012 |
| JP | 2012-195794 A | 10/2012 |
| JP | 5526638 B2 | 6/2014 |
| WO | 2010/059179 A1 | 5/2010 |

* cited by examiner ured elapsed times. The processor determines whether the communication channel which is used by the communicator is to be switched to another communication channel on the basis of the set determination reference time and the elapsed time measured after the determination reference time has been set. The processor controls switching of the communication channel which is used by the communicator on the basis of the result of determination of the communication channel.

A second aspect of the present invention provides the image receiving terminal according to the first aspect, wherein the processor may determine that the communication channel which is used by the communicator is to be switched to another communication channel when the plurality of elapsed times measured after the determination reference time has been set are continuously greater than the determination reference time.

A third aspect of the present invention provides the image receiving terminal according to the first aspect, wherein the processor may set a time period based on the longest elapsed time among the plurality of measured elapsed times as the determination reference time.

A fourth aspect of the present invention provides the provides the image receiving terminal according to the first aspect, wherein the processor may set a time period based on the elapsed time with the highest occurrence frequency among the plurality of measured elapsed times as the determination reference time.

A fifth aspect of the present invention provides the image receiving terminal according to the first aspect, wherein an allowable frequency may be set in advance for each elapsed time included in the plurality of elapsed times longer than the determination reference time. The allowable frequency becomes smaller as the elapsed time becomes longer than the determination reference time. The processor may determine that the communication channel which is used by the communicator is to be switched to another communication channel when the elapsed time measured after the determination reference time has been set is longer than the determination reference time and an occurrence frequency of the measured elapsed time is higher than the allowable frequency for the measured elapsed time.

A sixth aspect of the present invention provides the image receiving terminal according to the first aspect, wherein the specific packet may be one of the communication packets other than a final packet among the plurality of communication packets corresponding to the image of one frame. The final packet is a communication packet which is received finally among the plurality of communication packets corresponding to the image of one frame. The processor may calculate a total data volume of the divided images which have not been received by the communicator yet among the divided images corresponding to the image of one frame when the specific packet has been received by the communicator. The processor may determine whether reception of a determination target packet is completed before the display image is displayed on the monitor on the basis of the total data volume and a communication rate of the communicator. The determination target packet is the communication packet which is received by the communicator after the specific packet has been received. The processor may determine that the communication channel which is used by the communicator is to be switched to another communication channel when the processor determines that reception of the determination target packet is not completed before the display image is displayed on the monitor.

A seventh aspect of the present invention provides the image receiving terminal according to the first aspect, wherein the specific packet may be a final packet. The final packet is a communication packet which is received finally among the plurality of communication packets corresponding to the image of one frame. The processor may measure a reception interval between the communication packets which are received before the specific packet has been received. The processor may determine whether a remaining time in one frame when the specific packet has been received is shorter than the reception interval. The processor may determine that the communication channel which is used by the communicator is to be switched to another communication channel when the remaining time is shorter than the reception interval.

An image communication system according to an eighth aspect of the present invention includes an image receiving terminal and an image transmitting terminal. The image receiving terminal includes a first communicator and one or more fiat processors. The first communicator receives communication packets from the image transmitting terminal using a wireless communication channel. An image of one frame is divided into one or more images. Each communication packet includes the divided image. The image of one frame corresponds to a plurality of communication packets. The first processor generates a display image of one frame from the divided images included in the plurality of communication packets received by the first communicator. The first processor generates a vertical synchronization signal on the basis of a clock. The first processor outputs the display image to a monitor in synchronization with the vertical synchronization signal. The first processor measures a plurality of elapsed times by measuring an elapsed time each time the vertical synchronization signal is generated. Each elapsed time included in the plurality of elapsed times is a time period from a time point at which the vertical synchronization signal is generated to a time point at which a specific packet is received by the first communicator. The specific packet is one of the plurality of communication packets corresponding to the image of one frame. The first processor sets a determination reference time on the basis of the plurality of measured elapsed times. The first processor determines whether the communication channel which is used by the first communicator is to be switched to another communication channel on the basis of the set determination reference time and the elapsed time measured after the determination reference time has been set. The first processor controls switching of the communication channel which is used by the first communicator on the basis of the result of determination of the communication channel. The image transmitting terminal includes an imaging device, a second processor, and a second communicator. The imaging device performs imaging every imaging cycle and outputs the image of one frame every imaging cycle. The second processor generates the communication packet including the divided image included in the image of one frame. The second communicator transmits the communication packets to the image receiving terminal using the communication channel.

An image receiving method according to a ninth aspect of the present invention includes a first step, a second step, a third step, a fourth step, a fifth step, a sixth step, and a seventh step. In the first step, an image receiving terminal receives communication packets from an image transmitting terminal using a wireless communication channel by a communicator. An image of one frame is divided into one or more images. Each communication packet includes the divided image. The image of one frame corresponds to a plurality of communication packets. In the second step, the image receiving terminal generates a display image of one frame from the divided images included in the plurality of communication packets received by the communicator. In the third step, the image receiving terminal outputs the display image to a monitor in synchronization with a vertical synchronization signal. The vertical synchronization signal is generated on the basis of a clock. In the fourth step, the image receiving terminal measures a plurality of elapsed times by measuring an elapsed time each time the vertical synchronization signal is generated. Each elapsed time included in the plurality of elapsed times is a time period from a time point at which the vertical synchronization signal is generated to a time point at which a specific packet is received by the communicator. The specific packet is one of the plurality of communication packets corresponding to the image of one frame. In the fifth step, the image receiving terminal sets a determination reference time on the basis of the plurality of measured elapsed times. In the sixth step, the image receiving terminal determines whether the communication channel which is used by the communicator is to be switched to another communication channel on the basis of the set determination reference time and the elapsed time measured after the determination reference time has been set. In the seventh step, the image receiving terminal controls switching of the communication channel which is used by the communicator on the basis of the result of determination of the communication channel.

According to a tenth aspect of the present invention, there is provided a non-transitory computer-readable recording medium having a program recorded thereon, the program causing a computer to perform a first step, a second step, a third step, a fourth step, a fifth step, a sixth step, and a seventh step. The first step is a step of receiving communication packets from an image transmitting terminal using a wireless communication channel by a communicator. An image of one frame is divided into one or more images. Each communication packet includes the divided image. The image of one frame corresponds to a plurality of communication packets. The second step is a step of generating a display image of one frame from the divided images included in the plurality of communication packets received by the communicator. The third step is a step of outputting the display image to a monitor in synchronization with a vertical synchronization signal. The vertical synchronization signal is generated on the basis of a clock. The fourth step is a step of measuring a plurality of elapsed times by measuring an elapsed time each time the vertical synchronization signal is generated. Each elapsed time included in the plurality of elapsed times is a time period from a time point at which the vertical synchronization signal is generated to a time point at which a specific packet is received by the communicator. The specific packet is one of the plurality of communication packets corresponding to the image of one frame. The fifth step is a step of setting a determination reference time on the basis of the plurality of measured elapsed times. The sixth step is a step of determining whether the communication channel which is used by the communicator is to be switched to another communication channel on the basis of the set determination reference time and the elapsed time measured after the determination reference time has been set. The seventh step is a step of controlling switching of the communication channel which is used by the communicator on the basis of the result of determination of the communication channel.

DETAILED DESCRIPTION OF THE INVENTION

Embodiments of the present invention will be described below with reference to the drawings.

First Embodiment

Figure 1:
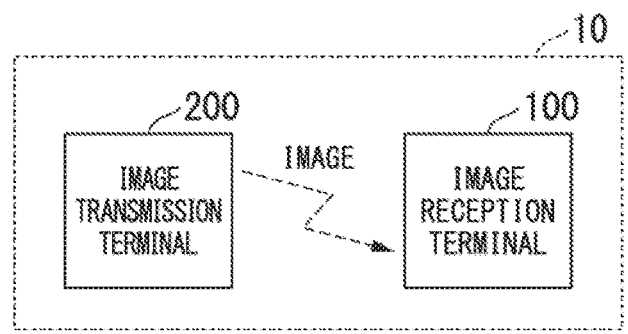
FIG. 1 is a block diagram showing a configuration of an image communication system according to a first embodiment of the present invention.

FIG. 1 shows a configuration of an image communication system 10 according to a first embodiment of the present invention. As shown in FIG. 1, the image communication system 10 includes an image receiving terminal 100 and an image transmitting terminal 200. The image receiving terminal 100 and the image transmitting terminal 200 communicate wirelessly with each other. For example, the image communication system 10 may be a wireless endoscope system. For example, the image receiving terminal 100 is an endoscope processor and the image transmitting terminal 200 is an endoscope. The image communication system 10 is not limited to a wireless endoscope system, and may be an arbitrary system that can perform wireless image communication. The image receiving terminal 100 may be a mobile terminal with a set top box (STB) which can be wirelessly connected to a digital camera or a display. The image transmitting terminal 200 may be a digital camera or a microscope.

Figure 2:
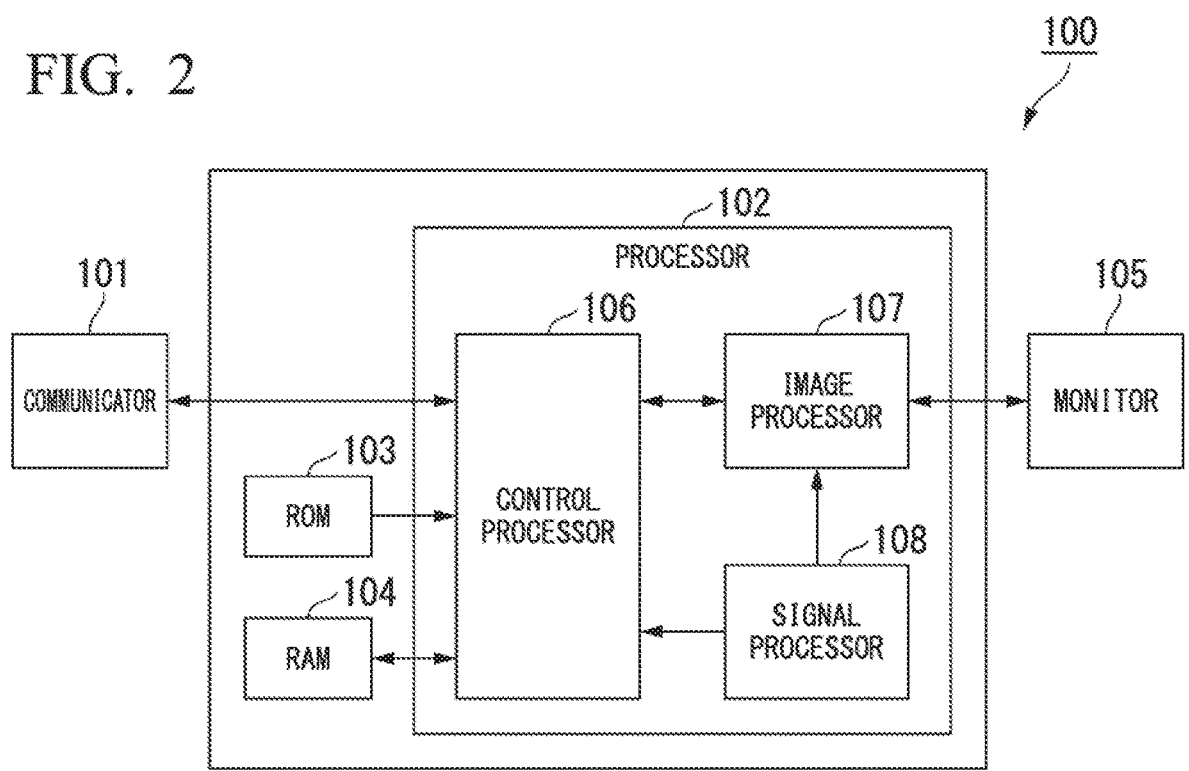
FIG. 2 is a block diagram showing a configuration of an image receiving terminal according to the first embodiment of the present invention.
Figure 3:
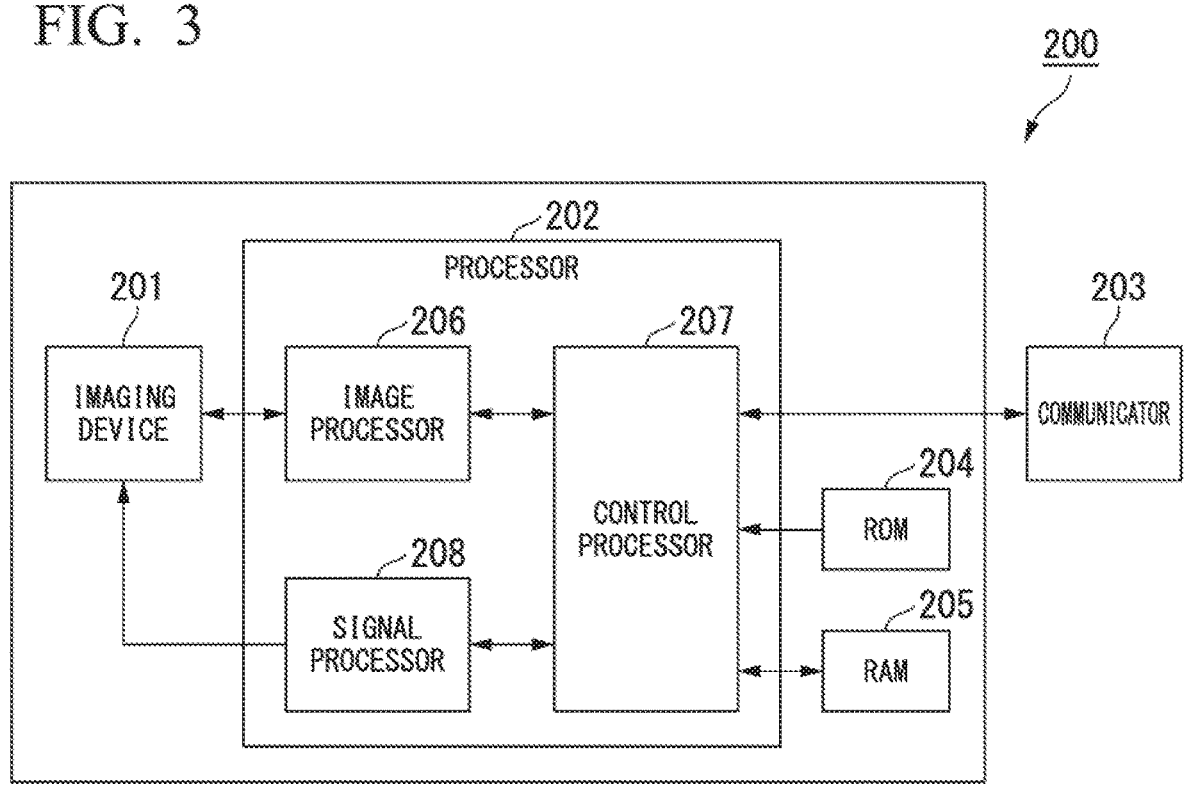
FIG. 3 is a block diagram showing a configuration of an image transmitting terminal according to the first embodiment of the present invention.

FIG. 2 shows a configuration of the image receiving terminal 100. FIG. 3 shows a configuration of the image transmitting terminal 200.

The image receiving terminal 100 will be schematically described below. The image receiving terminal 100 includes at least a communicator 101 (a first communicator) and a processor 102 (a first processor). The communicator 101 receives communication packets from the image transmitting terminal 200 using a wireless communication channel. An image of one frame is divided into one or more images. Each communication packet includes the divided image. The image of one frame corresponds to a plurality of communication packets. The processor 102 generates a display image of one frame from the divided images included in the plurality of communication packets received by the communicator 101. The processor 102 generates a vertical synchronization signal on the basis of a clock. The processor 102 outputs the display image to a monitor 105 in synchronization with the vertical synchronization signal. The processor 102 measures a plurality of elapsed times by measuring an elapsed time each time the vertical synchronization signal is generated. Each elapsed time included in the plurality of elapsed times is a time period from a time point at which the vertical synchronization signal is generated to a time point at which a specific packet is received by the communicator 101. The specific packet is one of the plurality of communication packets corresponding to the image of one frame. The processor 102 sets a determination reference time on the basis of the plurality of measured elapsed times. The processor 102 determines whether the communication channel which is used by the communicator 101 is to be switched to another communication channel on the basis of the set determination reference time and the elapsed time measured after the determination reference time has been set. The processor 102 controls switching of the communication channel which is used by the communicator 101 on the basis of the result of determination of the communication channel.

For example, the specific packet is a communication packet which is first received, that is, a first packet, among a plurality of communication packets corresponding to an image of one frame. When the specific packet is a first packet, it is possible to detect deterioration of a wireless communication environment at the earliest timing in one frame. The specific packet may be a communication packet other than a final packet among a plurality of communication packets corresponding to an image of one frame. The final packet is a communication packet which is finally received among the plurality of communication packets corresponding to an image of one frame. When the specific packet is a communication packet other than the final packet, it is possible to detect deterioration of a wireless communication environment at an earlier timing in one frame. The specific packet may be a final packet.

Details of the image receiving terminal 100 will be described below. As shown in FIG. 2, the image receiving terminal 100 includes the communicator 101, the processor 102, a ROM 103, a RAM 104, and the monitor 105. The elements shown in FIG. 2 are hardware.

For example, the communicator 101 is a wireless local area network (LAN) module. The communicator 101 performs wireless communication with the image transmitting terminal 200. The communicator 101 and the processor 102 are connected to each other by a predetermined interface. Examples of the predetermined interface include a universal serial bus (USB), a secure digital input/output bus (SDIO), and a PCI Express. The communicator 101 performs wireless communication using a communication channel which is set by the processor 102. The communicator 101 performs wireless communication using one of a plurality of communication channels. The communicator 101 performs wireless communication in accordance with a protocol based on standards of various interfaces. The communicator 101 receives communication packets from the image transmitting terminal 200 and outputs the received communication packets to the processor 102. Each communication packet includes divided image data constituting a divided image.

The processor 102 includes one or more processors. In FIG. 2, an example in which the processor 102 includes a control processor 106, an image processor 107, and a signal processor 108 is shown. For example, each processor includes at least one of a central processing unit (CPU), an application-specific integrated circuit (ASIC), and a field-programmable gate array (FPGA). At least two of the control processor 106, the image processor 107, and the signal processor 108 may be constituted as a single processor.

The control processor 106 performs various calculations and determinations in accordance with a program. The program is stored in the ROM 103. When the image receiving terminal 100 is started, the program in the ROM 103 is loaded into the RAM 104. The control processor 106 outputs divided image data included in a plurality of communication packets received by the communicator 101 to the image processor 107. The control processor 106 measures an elapsed time and sets a determination reference time. The control processor 106 performs determination associated with switching of a communication channel and switching control of the communication channel. The control processor 106 controls reception of an image of each frame and display of the image on the basis of a vertical synchronization signal.

When an elapsed time measured after the determination reference time has been set is longer than the determination reference time, the control processor 106 determines that the communication channel which is used by the communicator 101 is to be switched to another communication channel. In this case, the control processor 106 transmits channel information to the image transmitting terminal 200 by the communicator 101. The channel information indicates a communication channel which is used after the communication channel has been switched. After the channel information has been transmitted, the control processor 106 switches the communication channel which is used by the communicator 101 to a communication channel indicated by the channel information.

The control processor 106 receives image data or information from the image transmitting terminal 200 by the communicator 101. Specifically, the control processor 106 controls the communicator 101 such that image data or information is received from the image transmitting terminal 200. That is, the control processor 106 causes the communicator 101 to receive image data or information transmitted from the image transmitting terminal 200. Accordingly, the communicator 101 receives image data or information from the image transmitting terminal 200. The control processor 106 transmits information to the image transmitting terminal 200 by the communicator 101. Specifically, the control processor 106 controls the communicator 101 such that information is transmitted to the image transmitting terminal 200. That is, the control processor 106 causes the communicator 101 to transmit information to the image transmitting terminal 200. Accordingly, the communicator 101 transmits information to the image transmitting terminal 200.

The image processor 107 generates a display image. For example, the divided image data included in the communication packet received by the communicator 101 is compressed image data. The image processor 107 generates display image data constituting a display image by expanding the compressed image data corresponding to an image of one frame. The image processor 107 outputs the generated display image data to the monitor 105 in synchronization with a vertical synchronization The signal processor 108 generates a vertical synchronization signal on the basis of a clock. The vertical synchronization signal indicates a cycle for displaying an image on the monitor 105. The signal processor 108 outputs the generated vertical synchronization signal to the control processor 106 and the image processor 107. The signal processor 108 may be constituted by a phase locked loop (PLL) in an FPGA or a dedicated IC for an image signal process. The signal processor 108 may include an oscillation circuit such as a crystal oscillator module for generating a clock.

For example, the functions of the control processor 106, the image processor 107, and the signal processor 108 can be realized as software functions by causing one processor to read and execute a program including commands for defining operations of the processors. The program may be provided, for example, by a "computer-readable recording medium" such as a flash memory. The program may be transmitted from a computer including a storage device having the program stored therein to the image receiving terminal 100 by a transmission medium or by transmission waves in the transmission medium. The "transmission medium" for transmitting a program is a medium having a function of transmitting information like a network (a communication network) such as the Internet or a communication circuit (a communication line) such as a telephone line. A program may realize some of the functions. A program may be a differential file (a differential program) which can realize the functions in combination with a program which has been already recorded in a computer.

The ROM 103 is a nonvolatile memory such as a flash ROM. A program and various types of setting information are stored in the ROM 103. The program is used to control the image receiving terminal 100. The setting information includes communication setting parameters. The RAM 104 is a volatile memory. The RAM 104 is used as a buffer a work area, and a temporary area. The buffer is used to temporarily store image data. The work area is used for calculation or the like by the processor 102. The temporary area is used to temporarily store various types of setting information.

The monitor 105 displays a display image for each frame on the basis of the vertical synchronization signal. The monitor 105 need not be a part of the image receiving terminal 100. That is, the monitor 105 may be constituted as a device independent from the image receiving terminal 100.

When a measured elapsed time is longer than the determination reference time, a wireless communication environment deteriorates. Accordingly, a delay in reception of an image is likely to occur. There is a high likelihood that the wireless communication environment will be improved by switching a communication channel. The delay in reception of an image is decreased as a result of switching a communication channel.

The image transmitting terminal 200 will be schematically described below. The image transmitting terminal 200 includes at least an imaging device 201, a processor 202 (a second processor), and a communicator 203 (a second communicator). The imaging device 201 performs imaging every imaging cycle and outputs an image of one frame every imaging cycle. The processor 202 generates communication packets including divided images constituting the image of one frame. The communicator 203 transmits the communication packets to the image receiving terminal 100 using a wireless communication channel.

Details of the image transmitting terminal 200 will be described below. As shown in FIG. 3, the image transmitting terminal 200 includes the imaging device 201, the processor 202, the communicator 203, a ROM 204, and a RAM 205.

The imaging device 201 is an image sensor. For example, the imaging device 201 is constituted by a CMOS sensor or a CCD. The imaging device 201 converts light focused by a lens into an electrical signal, that is, an imaging signal. The imaging device 201 includes an analog-digital converter (AD converter) that converts an analog imaging signal into a digital signal, that is, image data. The AD converter may be constituted as a circuit in a stage subsequent to the imaging device 201. The imaging device 201 performs imaging every imaging cycle in synchronization with a vertical synchronization signal and acquires image data. The imaging device 201 outputs image data for each line.

The processor 202 includes one or more processors. In FIG. 3, an example in which the processor 202 includes an image processor 206, a control processor 207, and a signal processor 208 is shown. For example, each processor includes at least one of a CPU, an application-specific integrated circuit, and an FPGA. At least two of the image processor 206, the control processor 207, and the signal processor 208 may be constituted as a single processor.

The image processor 206 processes an image output from the imaging device 201. For example, the image processor 206 generates compressed image data by compressing image data, that is, divided image data, for each predetermined line. Before the image data is compressed, the image processor 206 may perform image processing such as noise reduction. A compression rate of image data may be variable. Alternatively, image data need not be compressed.

The control processor 207 performs various calculations and determinations in accordance with a program. The program is stored in the ROM 204. When the image transmitting terminal 200 is started, the program in the ROM 204 is loaded into the RAM 205. The control processor 207 generates communication packets including the compressed divided image data, that is, the compressed image data. An image of one frame corresponds to a plurality of communication packets. The control processor 207 outputs the generated communication pickets to the communicator 203. The control processor 207 controls transmission of the image of one frame on the basis of a vertical synchronization signal.

The control processor 207 controls switching of a communication channel which. is used by the communicator 203 on the basis of the result of switching of a communication channel in the control processor 106 of the image receiving terminal 100. When channel information is transmitted from the image receiving terminal 100, the control processor 207 receives the channel information from the image receiving terminal 100 by the communicator 203. The control processor 207 switches the communication channel which is used by the communicator 203 to the communication channel indicated by the channel information. The control processor 207 transmits image data or information to the image receiving terminal 100 by the communicator 203. Specifically, the control processor 207 controls the communicator 203 such that image data or information is transmitted to the image receiving terminal 100. That is, the control processor 207 causes the communicator 203 to transmit image data or information to the image receiving terminal 100. Accordingly, the communicator 203 transmits image data or information to the image receiving terminal 100. The control processor 207 receives information from the image receiving terminal 100 by the communicator 203. Specifically, the control processor 207 controls the communicator 203 such that information is received from the image receiving terminal 100. That is, the control processor 207 causes the communicator 203 to receive information transmitted from the image receiving terminal 100. Accordingly, the communicator 203 receives information from the image receiving terminal 100.

The signal processor 208 generates a vertical synchronization signal on the basis of a clock. The signal processor 208 outputs the generated vertical synchronization signal to the imaging device 201 and the control processor 207. The signal processor 208 may be constituted by a PLL in an FPGA or a dedicated IC for processing an image signal. The signal processor 208 may include an oscillation circuit such as a crystal oscillator module for generating a clock.

For example, the functions of the image processor 206, the control processor 207, and the signal processor 208 can be realized as software functions by causing one processor to read and execute a program including commands for defining operations of the processors. The embodiment of the program is the same as the embodiment of the program for realizing the functions of the processor 102.

For example, the communicator 203 is a wireless LAN module. The communicator 203 performs wireless communication with the image receiving terminal 100. The communicator 203 and the processor 202 are connected to each other by a predetermined interface. The communicator 203 performs wireless communication using a communication channel which is set by the processor 202. The communicator 203 performs wireless communication using one of a plurality of communication channels. The communicator 203 performs wireless communication in accordance with a protocol based on standards of various interfaces.

The ROM 204 is a nonvolatile memory such as a flash ROM. The program and various types of setting information are stored in the ROM 204. The program is used to control the image transmitting terminal 200. The setting information includes communication setting parameters. The RAM 205 is a volatile memory. The RAM 205 is used as a buffer, a work area, and a temporary area. The buffer is used to temporarily store image data. The work area is used for calculation or the like by the processor 202. The temporary area is used to temporarily store various types of setting information.

Figure 4:
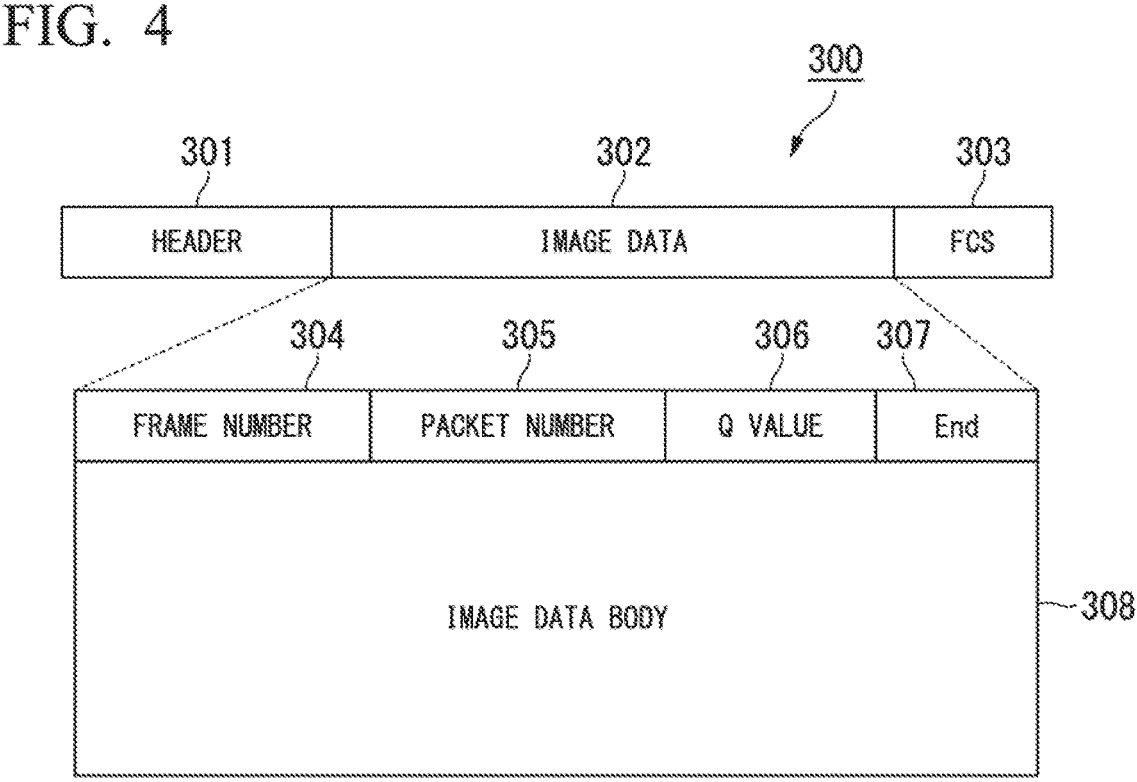
FIG. 4 is a reference diagram showing a configuration of a communication packet in the first embodiment of the present invention.

FIG. 4 shows an example of a configuration of a communication packet. The communication packet 300 includes a header 301, image data 302, and a frame check sequence (FCS) 303.

The header 301 includes address information of the image receiving terminal 100 and the image transmitting terminal 200. The FCS 303 includes a cyclic redundancy check (CRC) value for checking an error.

The image data 302 includes a frame number 304, a packet number 305, a Q value 306, an End 307, and an image data body 308. The frame number 304 is a number which is added to each image of one frame. The packet number 305 is a number which increases sequentially from 1 for each communication packet in an image of one frame. The packet number 305 starts from 1 for each frame. The Q value 306 is a value indicating a compression level of an image. A maximum data size of compressed image data can be estimated from the Q value 306. Data size information of a compressed image of one frame may be stored instead of the Q value 306. The End 307 indicates whether the communication packet is a final packet of an image of one frame. "1" is stored in the End 307 in the final packet of an image of one frame, and "0" is stored in the End 307 in a communication packet other than the final packet. The image data body 308 is compressed divided image data, that is, compressed image data.

Figure 5:
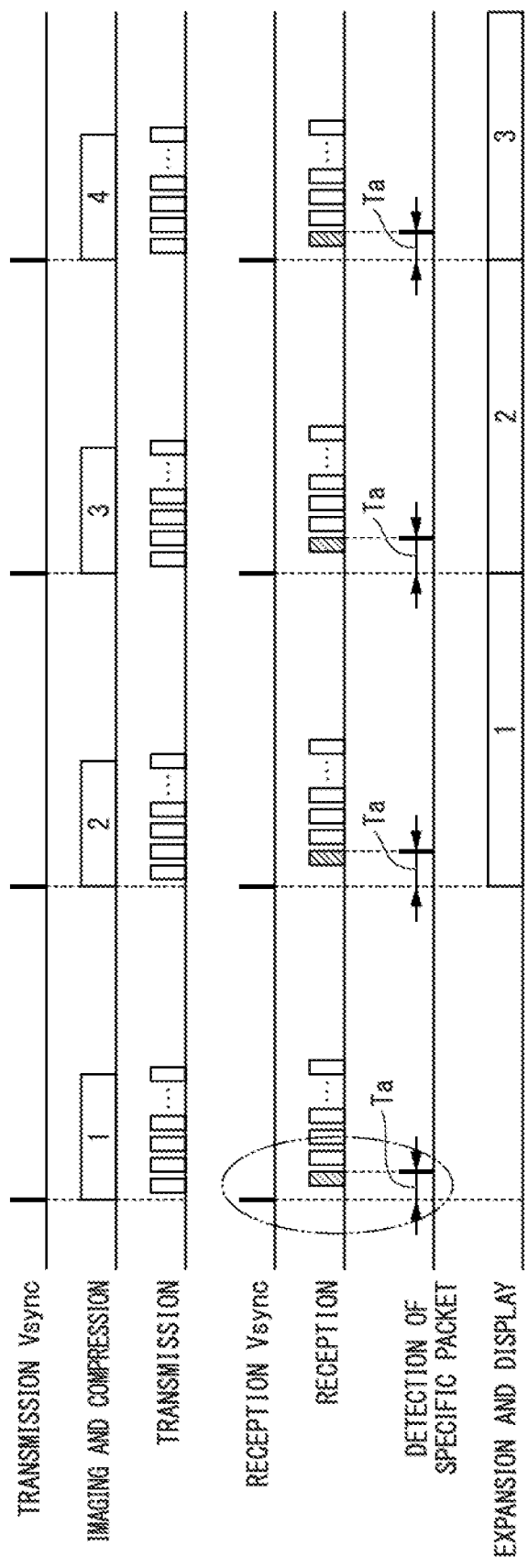
FIG. 5 is a timing chart showing schematic operations of the image receiving terminal and the image transmitting terminal according to the first embodiment of the present invention.

FIG. 5 shows schematic operations of the image receiving terminal 100 and the image transmitting terminal 200. The horizontal axis in FIG. 5 represents time. "Transmission Vsync" indicates a vertical synchronization signal in the image transmitting terminal 200. "Imaging and compression" indicates a timing of imaging and compression of an image in the image transmitting terminal 200. "Transmission" indicates a timing at which a communication packet is transmitted by the image transmitting terminal 200. "Reception Vsync" indicates a vertical synchronization signal in the image receiving terminal 100. "Reception" indicates a timing at which a communication packet is received by the image receiving terminal 100. "Detection of specific packet" indicates a timing at which a specific packet is detected. In FIG. 5, the specific packet is a first packet. "Expansion and display" indicates a timing of expansion and display of an image in the image receiving terminal 100.

The vertical synchronization signal indicates a start timing of a frame. In the example shown in FIG. 5, the vertical synchronization signal in the image transmitting terminal 200 is synchronized with the vertical synchronization signal in the image receiving terminal 100. Various methods can be used as a method of synchronizing transmission-side and reception-side vertical synchronization signals with each other. For example, a method disclosed in Japanese Unexamined Patent Application, First Publication No. 2011-109226 may be used.

The imaging device 201 images a subject in synchronization with the vertical synchronization signal generated by the signal processor 208 and outputs image data. The image processor 206 performs a compression process on the image data output from the imaging device 201. The control processor 207 generates communication packets including compressed divided image data and outputs the generated communication packets to the communicator 203. The communicator 203 sequentially transmits the communication packets to the image receiving terminal 100 in accordance with a communication protocol.

The communicator 101 sequentially receives the communication packets. When the control processor 106 detects that the first packet which is the specific packet has been received by the communicator 101, the control processor 106 generates a specific packet detection flag. For example, after the vertical synchronization signal has been generated, the control processor 106 determines that the communication packet which is first received is the first packet. Alternatively, when a packet number is added to a head of image data of each communication packet, the control processor 106 recognizes a communication packet with a packet number of "1" as a first packet. The packet number is added to a communication packet by the control processor 207.

The control processor 106 measures an elapsed time Ta from a tune point which is indicated by the vertical synchronization signal generated before the specific packet detection flag is generated to a time point at which the specific packet detection flag is generated. Immediately after transmission of an image has been started, the determination reference time is set to an initial value. The control processor 106 updates the determination reference time on the basis of the elapsed times Ta measured in a plurality of frames. In FIG. 5, operations after the determination reference time has been updated are shown.

The control processor 106 outputs the divided image data included in the communication packets to the image processor 107. The image processor 107 generates display image data by expanding the divided image data corresponding to an image of one frame. The image processor 107 outputs the generated display image data to the monitor 105 in synchronization with the vertical synchronization signal. The monitor 105 displays a display image on the basis of the display image data.

The initial value of the determination reference time will be described next. For example, the initial value of the determination reference time is set in consideration of an existing transmission delay time and a time period which is assumed when a retransmission frequency of the specific packet is a maximum. The time which is assumed when the retransmission frequency of the specific packet is a maximum is based on a transmission time per packet and a retransmission interval. For example, the retransmission interval includes a DIFS and a backoff time which are defined in IEEE 802.11.

For example, the transmission time per packet is calculated using a median value of values of a communicable physical rate. For example, the backoff time is determined randomly with a range of a predetermined amount of time (a set value CW of a contention window). The initial value of the determination reference time may be set on the basis of the backoff time when a median value of the set value CW is used. The existing transmission delay time is a fixed value which is defined by the process time of the whole system. The fixed value is stored in the ROM 103.

The initial value of the determination reference time is set on the basis of a time period according to a communication standard applied thereto, a time period according to a communication rate table which can be applied to the transmission side and the reception side, and the fixed value stored in the ROM 103.

Figure 6:
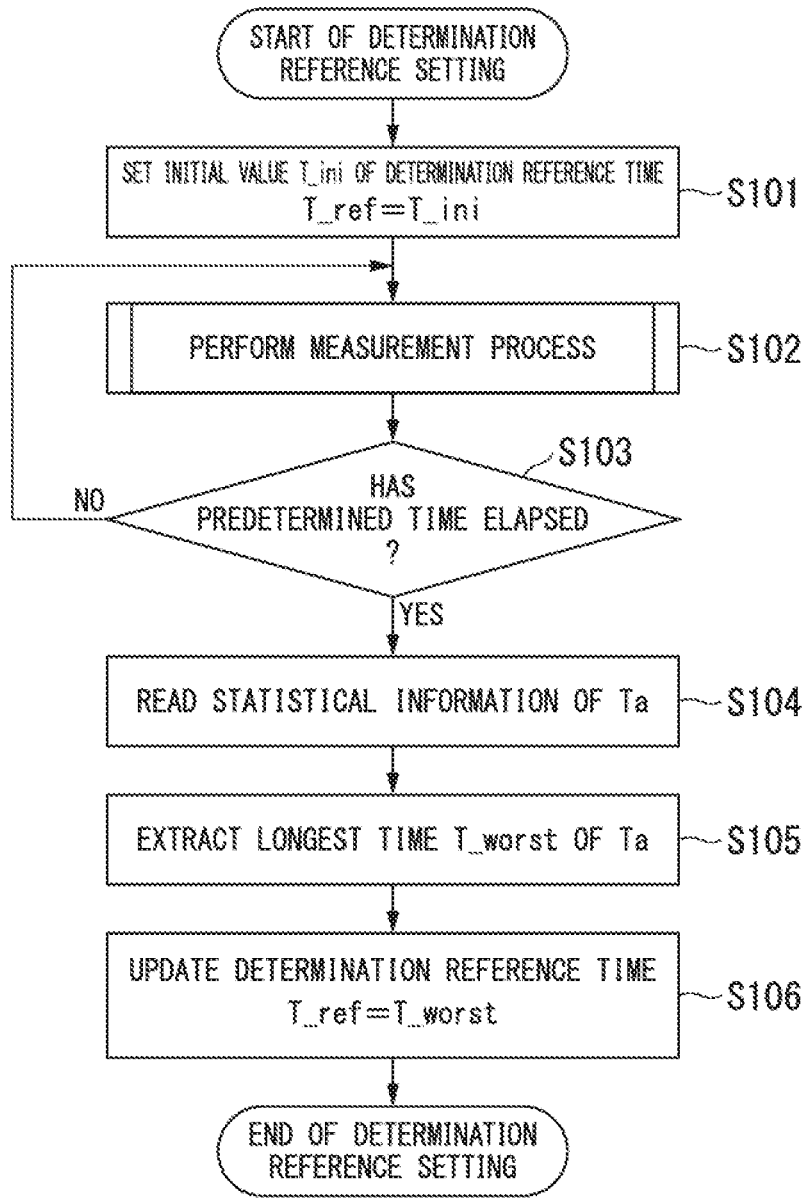
FIG. 6 is a flowchart showing a procedure of operations of the image receiving terminal according to the first embodiment of the present invention.
Figure 7:
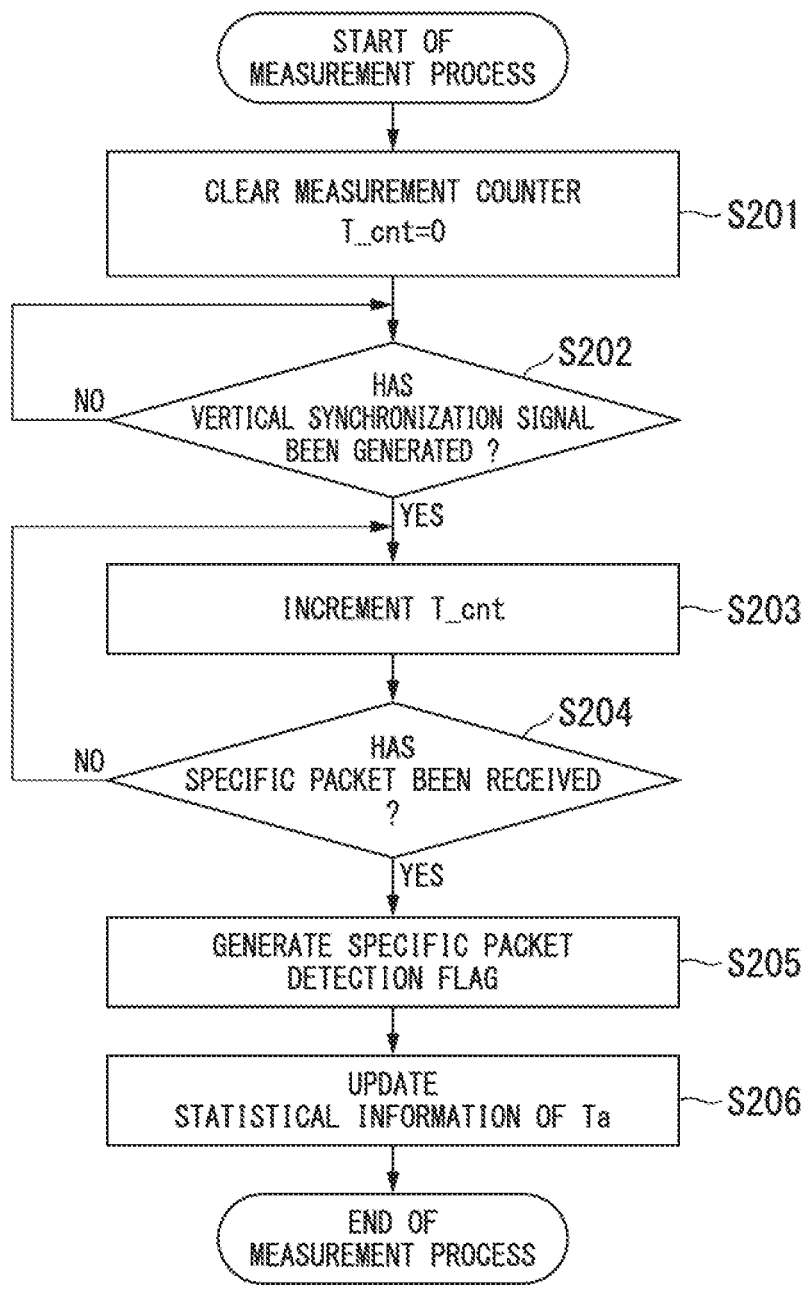
FIG. 7 is a flowchart showing a procedure of operations of the image receiving terminal according to the first embodiment of the present invention.

The operation of the image receiving terminal 100 in determination reference setting will be described below with reference to FIGS. 6 and 7. The image receiving terminal 100 sets the determination reference time through the determination reference setting. The process shown in FIGS. 6 and 7 is performed in parallel with reception and display of an image. FIG. 6 shows a procedure of the determination reference setting as a whole.

Before transmission of an image is started, the control processor 106 sets a determination reference time T_ref to an initial value T_ini of the determination reference time (Step S101). For example, the initial value T_ini of the determination reference time is set to the fixed value stored in the ROM 103. When the elapsed times Ta measured in the past communications are stored in the RAM 104, the initial value T_ini of the determination reference time may be a value which is calculated from the elapsed times Ta measured in the past communications. The initial value T_ini of the determination reference time is stored in the RAM 104. The image receiving terminal 100 may include an electronically erasable and programmable read only memory (EEPROM) and the elapsed times Ta measured in the past communications may be stored in the EEPROM.

After the initial value T_ini of the determination reference time has been set, the control processor 106 performs a measurement process. The control processor 106 measures the elapsed time Ta by the measurement process. The measurement result of the elapsed time Ta is stored as statistical information in the RAM 104 (Step S102).

After the measurement process has been performed, the control processor 106 determines whether a predetermined amount of time has elapsed from a time point at which the initial value T_ini of the determination reference time has been set (Step S103). When the control processor 106 determines that the predetermined amount of time has not elapsed in Step S103, the measurement process of Step S102 is performed. That is, the measurement process is repeatedly performed in the predetermined amount of time.

When the control processor 106 determines that the predetermined amount of time has elapsed in Step S103, the control processor 106 reads the statistical information of the elapsed time Ta from the RAM 104 (Step S104).

After the statistical information of the elapsed time Ta has been read, the control processor 106 extracts a longest time T_worst which is a maximum value of the elapsed time Ta from the statistical information (Step S105).

After the longest time T_worst has been extracted, the control processor 106 updates the determination reference time T_ref using the longest time T_worst. That is, the longest time T_worst is set as the determination reference time T_ref. The updated determination reference time T_ref is stored in the RAM 104 (Step S106). When the determination reference time T_ref is updated, the determination reference setting ends.

FIG. 7 shows a procedure of the measurement process (Step S102). The control processor 106 clears a measurement counter (Step S201). At this time, the value T_cnt of the measurement counter is zero. The value T_cnt of the measurement counter indicates the elapsed time Ta.

After the measurement counter has been cleared, the control processor 106 waits until a vertical synchronization signal is generated by the signal processor 108 (Step S202).

When the vertical synchronization signal is generated, the control processor 106 increments the value T_cnt of the measurement counter (Step S203).

After the value T_cnt of the measurement counter has been incremented, the control processor 106 monitors the communicator 101 and determines Whether a specific packet has been received (Step S204). When the control processor 106 determines that the specific packet has not been received in Step S204, the process of Step S204 is continuously performed.

When the control processor 106 determines that the specific packet has been received in Step S204, the control processor 106 generates a specific packet detection flag (Step S205).

After the specific packet detection flag has been generated, the control processor 106 updates the statistical information of the elapsed time Ta by adding the value T_cnt of the measurement counter to the statistical information of the elapsed time Ta (Step S206). For example, the statistical information of the elapsed time Ta is a histogram of the elapsed time Ta. When the statistical information of the elapsed time Ta is updated, the measurement process ends.

Through the process shown in FIGS. 6 and 7, the initial value T_ini is used as the determination reference time and the statistical information of the elapsed time Ta is accumulated in the RAM 104 until a predetermined amount of time elapses. The predetermined amount of time is a time period corresponding to two or more frames. Accordingly, the control processor 106 measures the elapsed time each time the vertical synchronization signal is generated in a period equal to or longer than two frames. For example, the predetermined amount of time is 20 seconds. When 60 frames constitute one second, the predetermined amount of time is a time period corresponding to 1200 frames. That is, the elapsed time Ta is measured 1200 times. After the predetermined amount of time has elapsed, the control processor 106 reads the histogram of the elapsed time Ta from the RAM 104. The control processor 106 updates the determination reference time T_ref on the basis of the measured value of the elapsed time Ta in the histogram. In the above-mentioned example, the determination reference time is set to the longest time T_worst which is the maximum value of the elapsed times Ta. That is, the control processor 106 sets the longest elapsed time Ta among a plurality of measured elapsed times Ta as the determination reference time T_ref.

The determination reference time may be set to the most frequent value of the elapsed time Ta. That is, the control processor 106 may set the elapsed time Ta having the highest occurrence frequency among a plurality of measured elapsed times Ta as the determination reference time.

Figure 8:
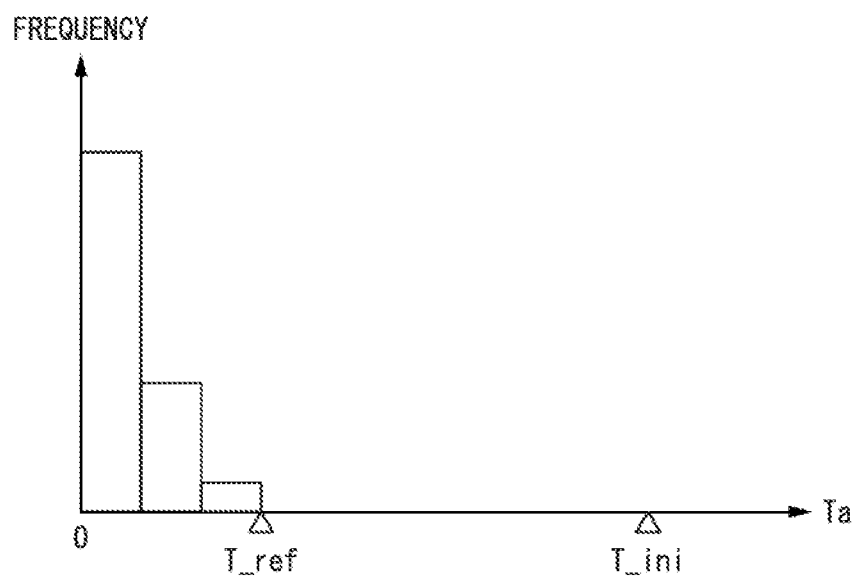
FIG. 8 is a histogram of an elapsed time in the first embodiment of the present invention.
Figure 9:
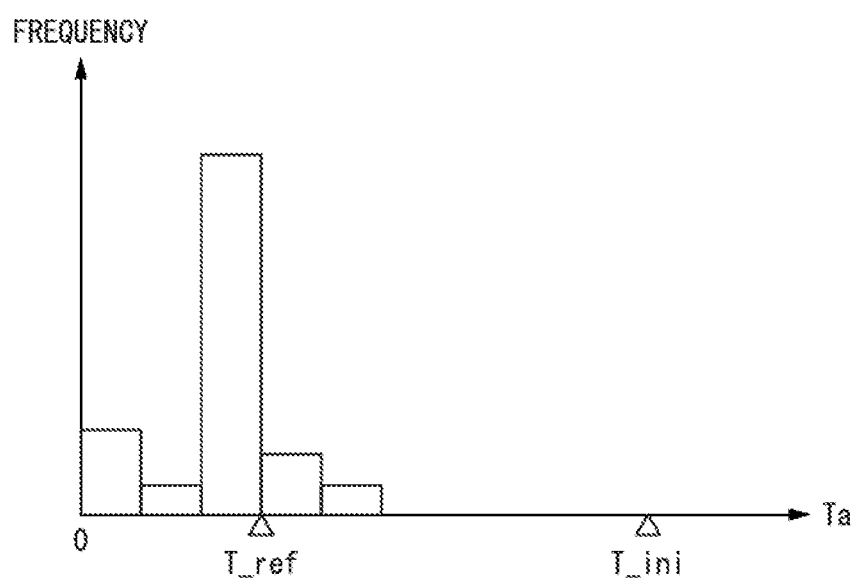
FIG. 9 is a histogram of an elapsed time in the first embodiment of the present invention.

FIGS. 8 and 9 show examples of the histogram of the elapsed time Ta. In the histograms shown in FIGS. 8 and 9, the horizontal axis represents the elapsed time Ta and the vertical axis represents the frequency. The frequency is recorded for each predetermined range of the measured elapsed time Ta. In FIG. 8, the frequency of the elapsed time Ta in the predetermined range is recorded for each of three predetermined ranges. In FIG. 9, the frequency of the elapsed time Ta in the predetermined range is recorded for each of five predetermined ranges. In FIG. 8, the updated determination reference time T_ref is the maximum value of the elapsed time Ta. In FIG. 9, the updated determination reference time T_ref is the most frequent value of the measured elapsed time Ta. In the examples shown in FIGS. 8 and 9, the updated determination reference time T_ref is less than the T_ini of the determination reference time. The updated determination reference time T_ref may be larger than the initial value T_ini of the determination reference time.

A tighter or looser determination reference time may be set with respect to the maximum value or the most frequent value which is the actual measurement value of the elapsed time Ta. For example, the control processor 106 may set the determination reference time T_ref in consideration of a predetermined value with respect to the maximum value or the most frequent value. For example, the predetermined value may be a value obtained in consideration of a deviation, that is, a standard deviation σ, of the histogram. For example, the control processor 106 sets a value, which is less by 3σ than the maximum value or the most frequent value, as the determination reference time T_ref in order to secure a margin of 3σ. Accordingly, a tighter determination reference time T_ref is set. Alternatively, when a value greater by 3σ than the maximum value or the most frequent value is not water than the initial value T_ini of the determination reference time, the control processor 106 sets the value greater by 3σ than the maximum value or the most frequent value as the determination reference time T_ref. Accordingly, a looser determination reference time T_ref is set.

As described above, the control processor 106 sets a time period based on the longest elapsed time Ta among, a plurality of measured elapsed times Ta as the determination reference time T_ref. Alternatively, the control processor 106 sets a time period based on the elapsed time Ta having the highest occurrence frequency among the plurality of measured elapsed times Ta as the determination reference time T_ref. The method of setting the determination reference time T_ref is not limited to the above-mentioned methods.

The control processor 106 may set the determination reference time T_ref based on the statistical information of the elapsed times Ta a plurality of times. That is, the control processor 106 may continuously update the statistical information of the elapsed times Ta and may periodically update the determination reference time. For example, the control processor 106 updates the determination reference time once for 60 seconds. By periodically updating the determination reference time, a more suitable determination reference time can be set depending on change of the wireless communication environment. Accordingly, it is possible to reduce a delay in reception of an image due to deterioration of the wireless communication environment in real time.

In the histogram of the elapsed times Ta the width of a time range in which the frequency is calculated may be set to be small. That is, a resolution in the time direction in the histogram of the elapsed times Ta may be set to be high. Accordingly, it is possible to detect minute change of the elapsed time Ta.

Figure 10:
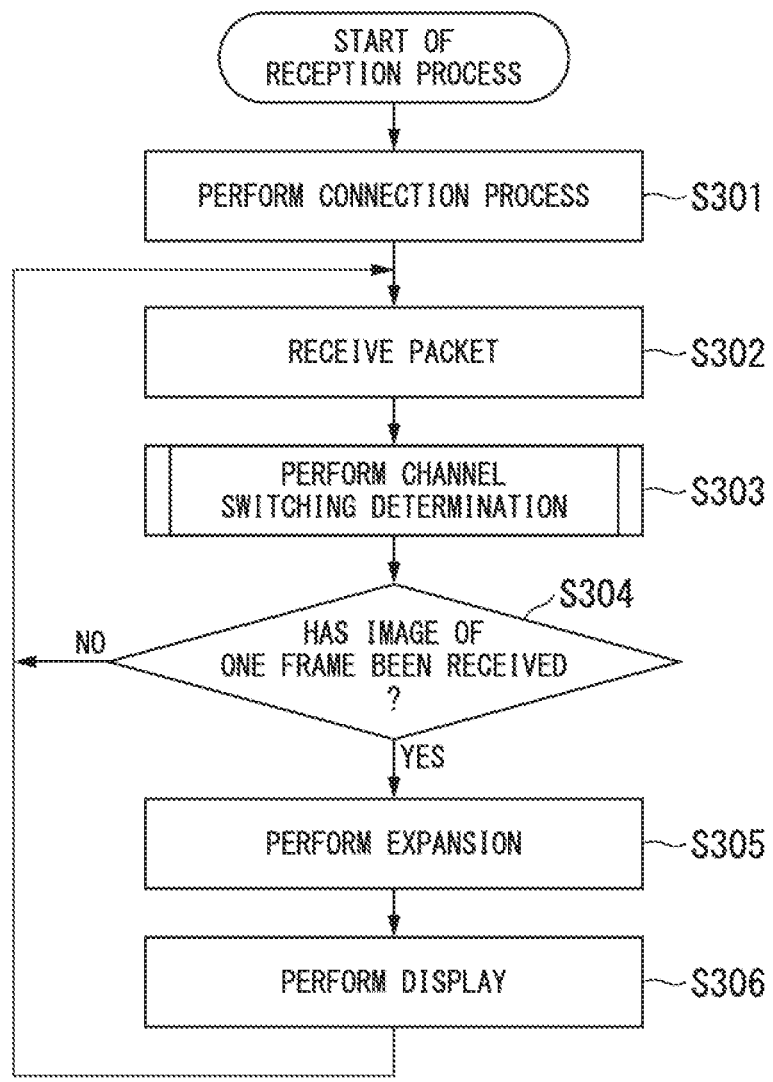
FIG. 10 is a flowchart showing a procedure of operations of the image receiving terminal according to the first embodiment of the present invention.
Figure 11:
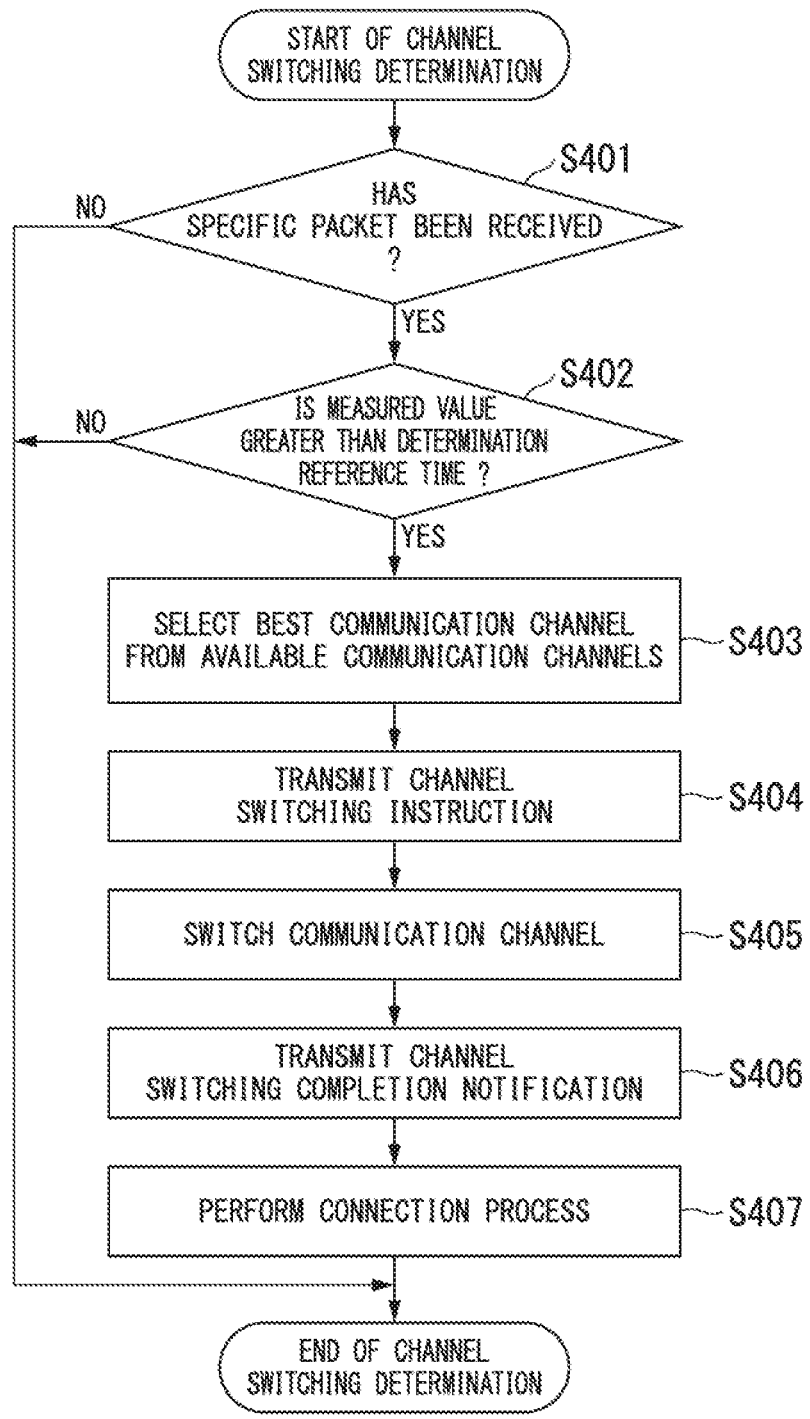
FIG. 11 is a flowchart showing a procedure of operations of the image receiving terminal according to the first embodiment of the present invention.

The operation of the image receiving terminal 100 in a reception process will be described below with reference to FIGS. 10 and 11. The image receiving terminal 100 receives an image from the image transmitting terminal 200 through the reception process and displays the received image. The process shown in FIGS. 10 and 11 is performed in parallel with the process shown in FIGS. 6 and 7. FIG. 10 showing a procedure of the reception process as a whole.

The control processor 106 performs a connection process (Step S301). In the connection process, the control processor 106 is wirelessly connected to the image transmitting terminal 200 by the communicator 101. At this time, the control processor 106 sets a communication channel in the communicator 101. Through the connection process, a communication link between the image receiving terminal 100 and the image transmitting terminal 200 is set up and data communication therebetween is possible. The connection process is a general process and thus a detailed description of the connection process will be omitted.

After the connection process has been performed, the control processor 106 receives the communication packets from the image transmitting terminal 200 by the communicator 101 (Step S302). Divided image data included in the received communication packets is stored in the RAM 104.

After the communication packets have been received, the control processor 106 performs channel switching determination (Step S303). The control processor 106 determines whether the communication channel which is used by the communicator 101 is to be switched to another communication channel through the channel switching determination. When the wireless communication environment deteriorates, the control processor 106 switches the communication channel.

After the channel switching determination has been performed, the control processor 106 determines whether an image of one frame has been received (Step S304). For example, when the End 307 added to a communication packet received in Step S302 immediately before the determination of Step S304 is "1," the control processor 106 determines that an image of one frame has been received. When the End 307 is "0," the control processor 106 determines that an image of one frame has not been received.

When the control processor 106 determines that an image of one frame has not been received in Step S304, the process of Step S302 is performed. When the control processor 106 determines that an image of one frame has been received in Step S304, the control processor 106 reads divided image data corresponding to the image of one frame from the RAM 104 and outputs the read divided image data to the image processor 107. The image processor 107 generates display image data by expanding the divided image data corresponding to the image of one frame (Step S305). As described above, the image data need not be compressed. Accordingly, in Step S305, the image processor 107 may generate the display image data from the divided image data corresponding to the image of one frame without expanding the divided image data.

After the display image data has been generated, the image processor 107 outputs the generated display image data to the monitor 105 (Step S306). As a result, the monitor 105 displays a display image based on the display image data. After the display image data has been output, the process of Step S302 is performed.

When communication packets have been received, the control processor 106 transmits an ACK to the image transmitting terminal 200 by the communicator 101. The ACK indicates that communication packets have been normally received. A process associated with the ACK is a general process and the process is not shown in FIG. 10.

FIG. 11 shows a procedure of the channel switching determination (Step S303).

The control processor 106 determines whether a specific packet has been received. That is, the control processor 106 determines whether the communication packet received in Step S302 immediately before the channel switching determination is the specific packet (Step S401). When the control processor 1066 determines that the specific packet has not been received in Step S401, the channel switching determination ends.

When the control processor 106 determines that the specific packet has been received in Step S401, the control processor 106 determines whether a measured value of the elapsed time is greater than the determination reference time (Step S402). A process such as the measurement process shown in FIG. 7 is performed in parallel with the channel switching determination. Accordingly, the elapsed time is measured. The measured value of the elapsed time is used in Step S402. The determination reference time used in Step S402 is the initial value T_ini of the determination reference time or the updated determination reference time T_ref.

When it is determined in Step S402 that the measured value of the elapsed time is equal to or less than the determination reference time, the control processor 106 determines that the communication channel which is used by the communicator 101 is not to be switched. In this case, the channel switching determination ends. When it is determined in Step S402 that the measured value of the elapsed time is greater than the determination reference time, the control processor 106 determines that the communication channel which is used by the communicator 101 is to be switched. In this case, the control processor 106 selects the best communication channel from available communication channels other than the communication channel which is used by the communicator 101 (Step S403). The communication channel selected in Step S403 is different from the communication channel which is used by the communicator 101. The communication channel selected in Step S403 has only to be a communication channel having better communication quality than the communication channel which is used by the communicator 101.

The control processor 106 estimates quality of a plurality of communication. channels which can be used by the communicator 101 in parallel with the control shown in FIGS. 10 and 11. The method of estimating a communication environment state, that is, channel quality estimation, may be a well-known method. For example, a method of periodically transmitting a packet from the reception side to the transmission side while switching the communication channel and measuring one of an error rate, a received signal strength indicator (RSSI), and a signal-to-noise ratio (SN ratio) can be employed. The communicator 101 and the communicator 203 may be constituted to simultaneously use a communication channel for image communication and a communication channel for channel quality estimation. The image receiving terminal 100 and the image transmitting terminal 200 may include a communicator for channel quality estimation in addition to the communicator 101 and the communicator 203. The method of switching a communication channel to a better communication channel is a general method and thus a detailed description of the method will be omitted.

After a communication channel has been selected, the control processor 106 transmits a channel switching instruction to the image transmitting terminal 200 by the communicator 101 (Step S404). The channel switching instruction includes channel information. The channel information indicates a communication channel which is used after the communication channel has been switched. That is, the channel information indicates the communication channel selected in Step S403.

After the channel switching instruction has been transmitted, the control processor 106 sets the communication channel selected in Step S403 for the communicator 101 (Step S405). Accordingly, the control processor 106 switches the communication channel set for the communicator 101 to the communication channel selected in Step S403. For example, when the communication channel has been switched, the initial value is set as the determination reference time.

After the communication channel has been switched, the control processor 106 transmits a channel switching completion notification to the image transmitting terminal 200 by the communicator 101 (Step S406). At this time, the communication channel set for the communicator 101 in Step S405 is used. The channel switching completion notification indicates completion of switching of a communication channel.

After the channel switching completion notification has been transmitted, the control processor 106 performs a connection process (Step S407). In the connection process, the control processor 106 is wirelessly connected to the image transmitting terminal 200 by the communicator 101. At this time, the communication channel set for the communicator 101 in Step S405 is used. Through the connection process, a communication link between the image receiving terminal 100 and the image transmitting terminal 200 is set up and data communication therebetween is possible. The connection process is a general process and thus a detailed description of the connection process will be omitted. When the connection process is performed, the channel switching determination ends.

Figure 12:
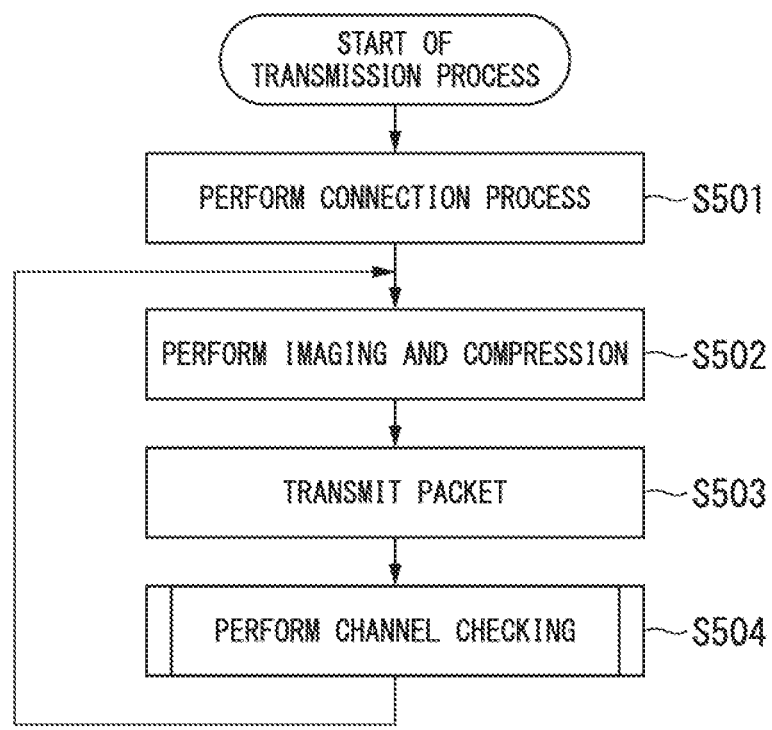
FIG. 12 is a flowchart showing a procedure of operations of the image transmitting terminal according to the first embodiment of the present invention.

The operation of the image transmitting terminal 200 in a transmission process will be described below with reference to FIGS. 12 and 13. The image transmitting terminal 200 transmits an image to the image receiving terminal 100 through the transmission process. FIG. 12 shows a procedure of the transmission process as a whole.

The control processor 207 performs a connection process (Step S501). In the connection process, the control processor 207 is wirelessly connected to the image receiving terminal 100 by the communicator 203. At this time, the control processor 207 sets a communication channel in the communicator 203. Through the connection process, a communication link between the image receiving terminal 100 and the image transmitting terminal 200 is set up and data communication therebetween is possible. The connection process is a general process and thus a detailed description of the connection process will be omitted. The connection process of Step S501 corresponds to the connection process of Step S301.

After the connection process has been performed, the imaging device 201 acquires image data by performing imaging, and the image processor 206 performs a compression process on the image data (Step S502).

After the imaging and the compression process have been performed, the control processor 207 transmits a communication packet to the image receiving terminal 100 by the communicator 203 (Step S501). The communication packet includes divided image data compressed in Step S502.

After the communication packet has been transmitted, the control processor 207 performs channel checking (Step S504). The control processor 207 checks whether it has been instructed to switch a communication channel by the image receiving terminal 100 through the channel checking. When it has been instructed to switch a communication channel by the image receiving terminal 100, the control processor 207 switches the communication channel. After the channel checking has been performed, the process of Step S502, is performed.

When an ACK responsive to the received communication packet has been transmitted by the image receiving terminal 100, the control processor 207 receives the ACK from the image receiving terminal 100 by the communicator 203. When the ACK is received within a predetermined amount of time, a next communication packet is transmitted. When the ACK is not received within the predetermined amount of time, the same communication packet is retransmitted. The ACK process in a MAC layer of a wireless LAN which is defined in IEEE 802.11 may be performed by the communicator 101 and the communicator 203. The process associated with the ACK is a general process and thus is not shown in FIG. 12.

Figure 13:
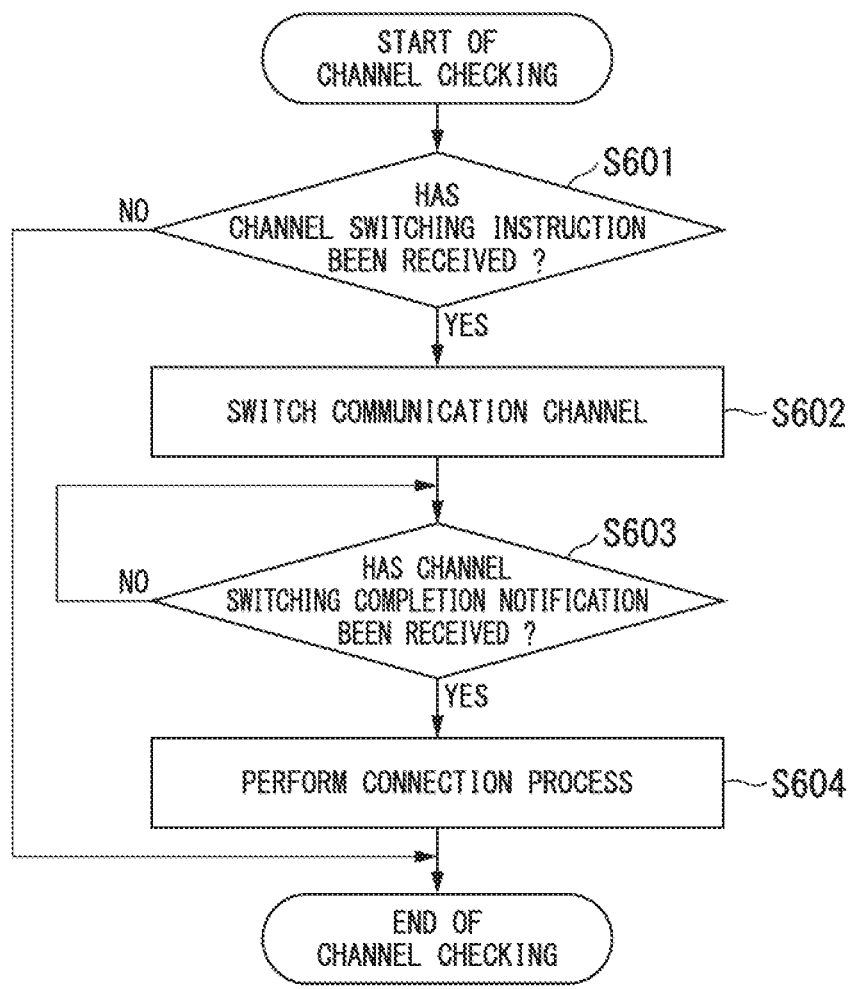
FIG. 13 is a flowchart showing a procedure of operations of the image transmitting terminal according to the first embodiment of the present invention.

FIG. 13 shows a procedure of the channel checking (Step S504). When a channel switching instruction has been transmitted from the image receiving terminal 100, the communicator 203 receives the channel switching instruction. The control processor 207 monitors the communicator 203 and determines whether a channel switching instruction has been received (Step S601). When the control processor 207 determines that a channel switching instruction has not been received in Step S601, the channel checking ends.

When the control processor 207 determines that a channel switching instruction has been received in Step S501, the control processor 207 sets a communication channel indicated by channel information included in the channel switching instruction in the communicator 203 (Step S602). Accordingly, the control processor 207 switches the communication channel set in the communicator 203 to the communication channel indicated by the channel information.

When a channel switching completion notification has been transmitted from the image receiving terminal 100, the communicator 203 receives the channel switching completion notification. At this time, the communication channel set in the communicator 203 in Step S602 is used. After the switching of the communication channel has been performed, the control processor 207 monitors the communicator 203 and determines whether a channel switching completion notification has been received (Step S603). When the control processor 207 determines that a channel switching completion notification has not been received in Step S603, the determination of Step S603 is continuously performed.

When the control processor 207 determines that a channel switching completion notification has been received in Step S603, the control processor 207 performs a connection process (Step S604). In the connection process, the control processor 207 is wirelessly connected to the image receiving terminal 100 by the communicator 203. At this time, the communication channel set in the communicator 203 in Step S602 is used. Through the connection process, a communication link between the image receiving terminal 100 and the image transmitting terminal 200 is set up and data communication therebetween is possible. The connection process is a general process and thus a detailed description of the connection process will be omitted. The connection process of Step S604 corresponds to the connection process of Step S407. When the connection process is performed, the channel checking ends.

Figure 14:
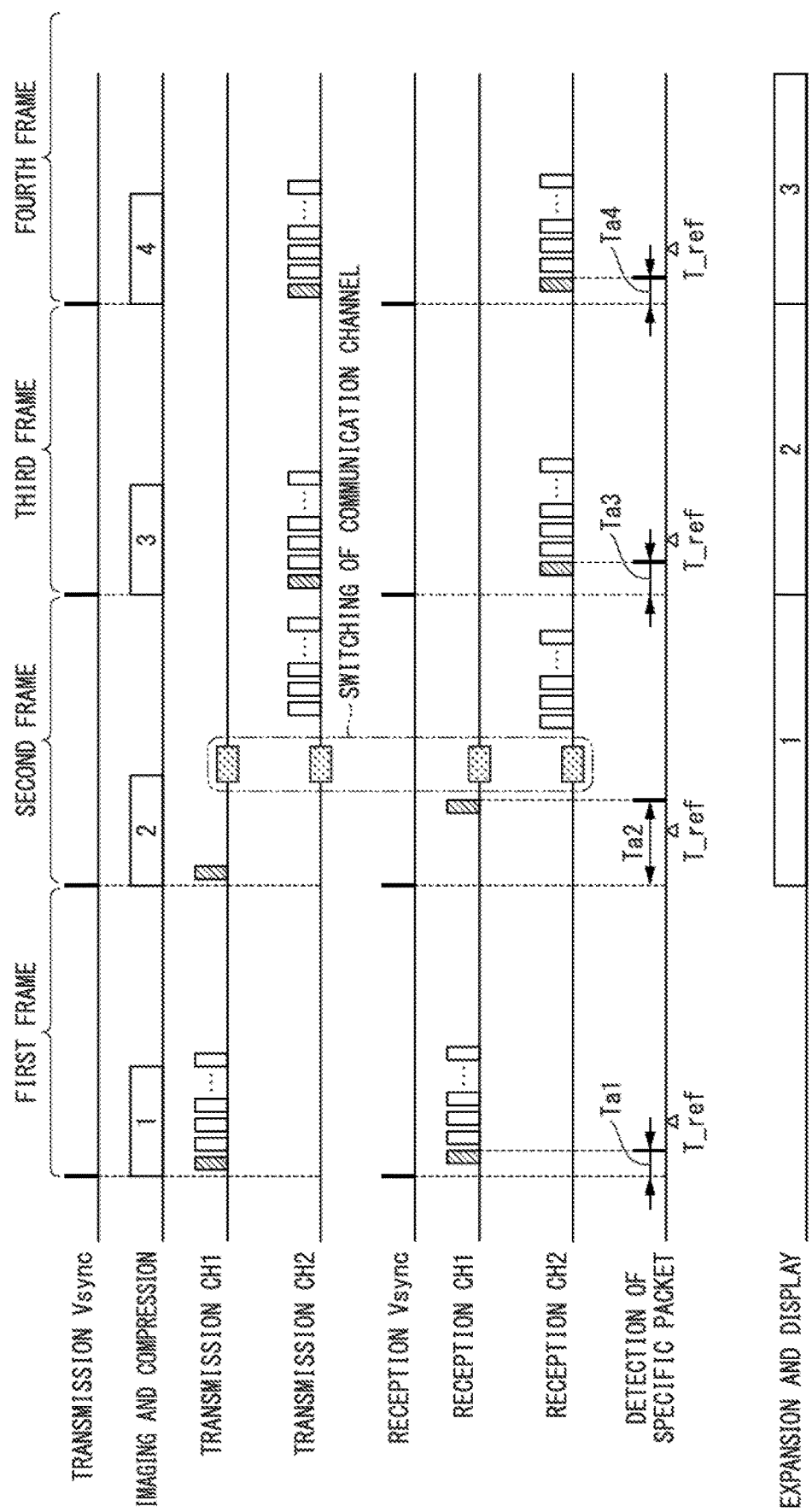
FIG. 14 is a timing chart showing schematic operations of the image receiving terminal and the image transmitting terminal according to the first embodiment of the present invention.
Figure 15:
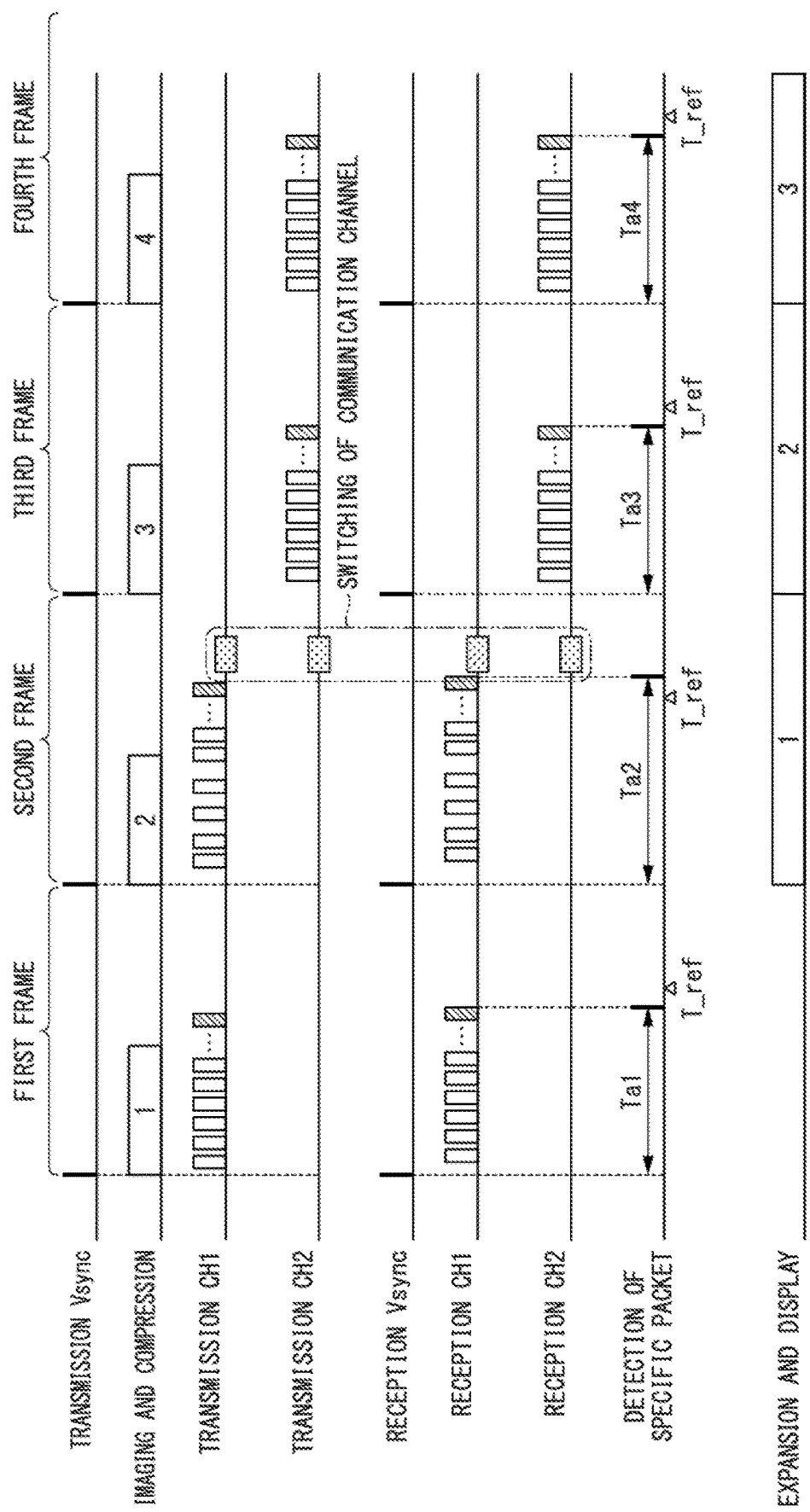
FIG. 15 is a timing chart showing schematic operations of the image receiving terminal and the image transmitting terminal according to the first embodiment of the present invention.

FIGS. 14 and 15 show schematic operations of the image receiving terminal 100 and the image transmitting terminal 200 when a communication channel is switched. The horizontal axis in FIGS. 14 and 15 represents time. Items shown in FIGS. 14 and 15 are the same as the items shown in FIG. 5. In FIGS. 14 and 15, "transmission" and "reception" are shown for each of a communication channel CHI and a communication. channel CH2. In FIGS. 14 and 15, operations after the determination reference time has been updated are shown.

In FIG. 14, the specific packet is a first packet. In FIG. 14, elapsed times Ta1 to Ta4 measured for four continuous frames are shown. In the first frame, the communication channel CH1 is used. In the first frame, the specific packet is transmitted and received using the communication channel CH1. In the first frame, the elapsed time Ta1 is smaller than the determination reference time T_ref. Accordingly, the control processor 106 determines that the communication channel which is used by the communicator 101 is not to be switched.

In the second frame, the elapsed time Ta2 is larger than the determination reference time T_ref. Accordingly, the control processor 106 determines that the communication channel which is used by the communicator 101 is to be switched. In the second frame, the control processor 106 switches the communication channel which is used by the communicator 101 from the communication channel CH1 to the communication channel CH2. In the second frame, communication packets subsequent to the specific packet are transmitted and received using the communication channel CH2. In the second frame, image data of one frame required for expansion and display is received in a time period smaller than one frame.

In the third and fourth frames, the elapsed time Ta3 and Ta4 are smaller than the determination reference time T_ref. Accordingly, the control processor 106 determines that the communication channel which is used by the communicator 101 is not to be switched.

In FIG. 15, the specific packet is a final packet. The operations shown in FIG. 15 are the same as the operations shown in FIG. 14 except that the specific packet is the final packet. In the first frame, the communication channel CH1 is used. In the first frame, since the elapsed time Ta1 is smaller than the determination reference time T_ref, switching of the communication channel is not performed. In the second frame, the elapsed time Ta2 is larger than the determination reference time T_ref. Accordingly, the control processor 106 switches the communication channel which is used by the communicator 101 from the communication channel CH1 to the communication channel CH2. In the second frame, image data of one frame required for expansion and display is received in a time period smaller than one frame. In the third and fourth frames, since the elapsed time Ta3 and the elapsed time Ta4 are smaller than the determination reference time T_ref, switching of the communication channel is not performed.

The specific packet may be a communication packet other than the first packet and the final packet. Description of operations when the specific packet is a communication packet other than the first packet and the final packet will be omitted.

The reason for variation of the elapsed time is that a communication packet transmitted from the transmission side is not received by the reception side, an ACK is not returned from the reception side to the transmission side, and thus a retransmission process is performed by the transmission side. The reason for occurrence of retransmission is considered to be deterioration of the wireless communication environment. For example, deterioration of the wireless communication environment includes at least one of interference with another wireless device, occurrence of fading, and change of a multipath environment. Accordingly, there is a high likelihood of improvement in the wireless communication environment by switching the wireless communication channel.

The image receiving terminal 100 and the image transmitting terminal 200 may include two or more communicators and a state in which a link of a communication channel for switching has been set up may be always maintained. For example, transmission of an image is performed via a primary channel and a communication link is maintained via a secondary channel. When it is instructed to switch a communication channel, the image receiving terminal 100 and the image transmitting terminal 200 switch the communication channel such that transmission of an image is performed via the secondary channel. Accordingly, it is possible to shorten the time required for switching a communication channel. In order to secure a good channel as the secondary channel, channel quality may be estimated every predetermined amount of time.

The image receiving terminal according to each aspect of the present invention need not include at least one of the ROM 103, the RAM 104, and the monitor 105. The image transmitting terminal according to each aspect of the present invention need not include at least one of the ROM 204 and the RAM 205.

An image receiving method according to each aspect of the present invention includes a first step, a second step, a third step, a fourth step, a fifth step, a sixth step, and a seventh step. In the first step, the processor 202 receives communication packets from the image transmitting terminal 200 using a wireless communication channel by the communicator 101 (Step S302). In the second step, the processor 202 generates a display image of one frame from the divided images included in the plurality of communication packets received by the communicator 101 (Step S305). In the third step, the processor 202 outputs the display image to the monitor 105 in synchronization with a vertical synchronization signal (Step S306). In the fourth step, the processor 202 measures a plurality of elapsed times by measuring an elapsed time each time the vertical synchronization signal is generated (Step S102). In the fifth step, the processor 202 sets the determination reference time on the basis of the plurality of measured elapsed times (Step S106). In the sixth step, the processor 202 determines whether the communication channel which is used by the communicator 101 is to be switched to another communication channel on the basis of the set determination reference time and the elapsed time measured after the determination reference time has been set (Step S402). In the seventh step, the processor 202 controls switching of the communication channel which is used by the communicator 101 on the basis of the result of determination (Step S4OS). The image receiving method according to each aspect of the present invention need not include any step other than the steps corresponding to the first to seventh steps.

In the first embodiment, it is determined whether the communication channel which is used by the communicator 101 is to be switched to another communication channel on the basis of the determination reference time and the elapsed time measured after the determination reference time has been set. Switching of the communication channel which is used by the communicator 101 is controlled on the basis of the result of determination of the communication channel. Accordingly, it is possible to reduce a delay in reception of an image due to deterioration of the wireless communication environment.

When the specific packet is a communication packet other than the final packet, it is possible to detect deterioration of the wireless communication environment at an earlier timing in one frame. Accordingly, it is possible to further reduce a delay in reception of an image due to the deterioration of the wireless communication environment. When the specific packet is a communication packet other than the final packet, it is possible to reduce a delay in reception of an image in a frame in which switching of a communication channel has been performed and a subsequent frame. When the specific packet is the final packet, it is possible to reduce a delay in reception of an image in a frame subsequent to the frame in which switching of a communication channel has been performed.

Second Embodiment

A second embodiment of the present invention will be described using the image receiving terminal 100 shown in FIG. 2 and the image transmitting terminal 200 shown in FIG. 3.

In the second embodiment, when a plurality of elapsed times measured after a determination reference time has been set are continuously greater than the determination reference time, the processor 102 determines that the communication channel which is used by the communicator 101 is to be switched to another communication channel. That is, when all of the plurality of elapsed times which are continuously measured are greater than the determination reference time, the processor 102 determines that the communication channel which is used by the communicator 101 is to be switched to another communication channel. The plurality of elapsed times are measured in a plurality of continuous frames.

When the elapsed time is greater than the determination reference time only one time, it cannot be said that deterioration of the communication environment is maintained. The control processor 106 can determine whether deterioration of the wireless communication environment is maintained by determining whether a plurality of elapsed times are continuously greater than the determination reference time. The number of elapsed times which are determination targets, that is, the number of frames, is two or more.

Figure 16:
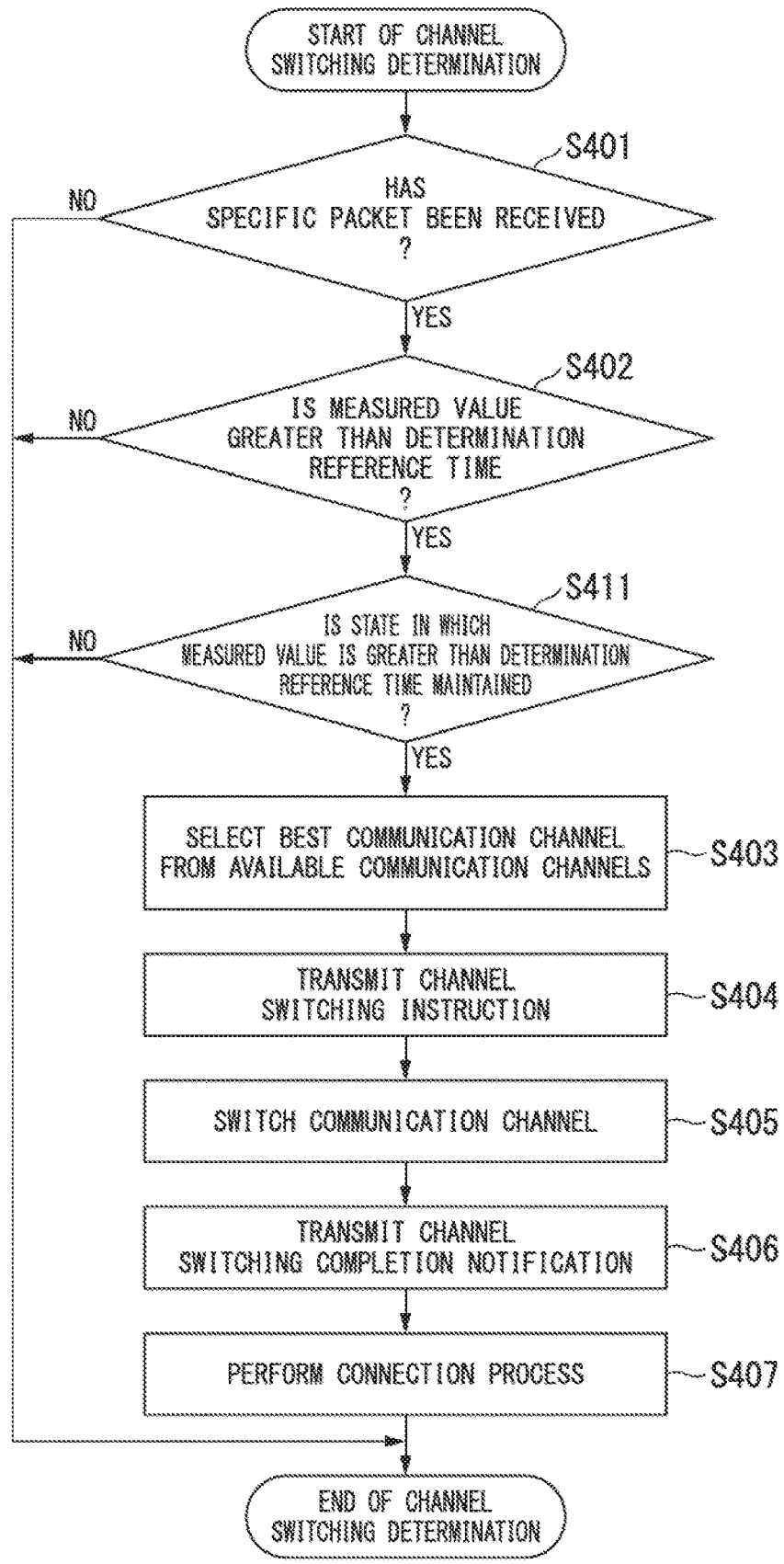
FIG. 16 is a flowchart showing a procedure of operations of an image receiving terminal according to a second embodiment of the present invention.

The operation of the image receiving terminal 100 will be described below with reference to FIG. 16. FIG. 16 shows a procedure of channel switching determination (Step S303). A difference between the operations shown in FIG. 16 and the operations shown in FIG. 11 will be described below.

In Step S402, when a measured value of the elapsed time is greater than the determination reference time, the control processor 106 determines whether a state in which the measured value of the elapsed time is greater than the determination reference time is continuously maintained. That is, the control processor 106 determines whether a plurality of elapsed times measured in a plurality of continuous frames including a current frame are greater than the determination reference time (Step S411).

When at least one of the plurality of elapsed times is equal to or less than the determination reference time in Step S411, the channel switching determination ends. When all of the plurality of elapsed times are greater than the determination reference time in Step S411, the control processor 106 determines that the communication channel which is used by the communicator 101 is to be switched. In this case, the process of Step S403 is performed.

Except for the above description, the operations shown in FIG. 16 are the same as the operations shown in FIG. 11.

In the second embodiment, it is possible to more accurately determine a state of the wireless communication environment by determining states of a plurality of elapsed times.

Third Embodiment

A third embodiment of the present invention will be described using the image receiving terminal 100 shown in FIG. 2 and the image transmitting terminal 200 shown in FIG. 3.

In the third embodiment, an allowable frequency is set in advance for each elapsed time included in a plurality of elapsed times which are longer than the determination reference time. As the elapsed time becomes longer than the determination reference time, the allowable frequency becomes smaller. When an elapsed time measured after the determination reference time has been set is greater than the determination reference time and an occurrence frequency of the measured elapsed time is greater than the allowable frequency for the measured elapsed time, the processor 102 determines that the communication channel which is used by the communicator 101 is to be switched to another communication channel.

Figure 17:
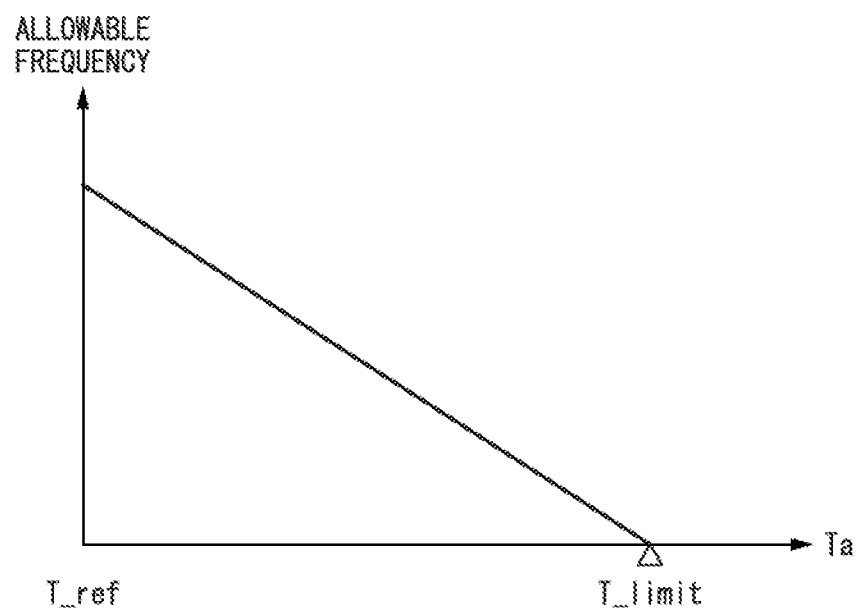
FIG. 17 is a graph showing an allowable frequency according to a third embodiment of the present invention.

FIG. 17 shows an example of a graph representing the allowable frequency. In the graph shown in FIG. 17, the horizontal axis represents the elapsed time Ta and the vertical axis represents the allowable frequency. The allowable frequency for the determination reference time T_ref is the greatest. The allowable frequency for a limit value T_limit of the determination reference time is the smallest. The limit value T_limit of the determination reference time is greater than the determination reference time T_ref. The allowable frequency of a first elapsed time is less than the allowable frequency of a second elapsed time. The first elapsed time and the second elapsed time are included in a period from the determination reference time T_ref to the limit value T_limit of the determination reference time. The first elapsed time is longer than the second elapsed time. In the graph shown in FIG. 17, the allowable frequency is a linear function of the elapsed lime Ta. A function representing a relationship between the elapsed time Ta and the allowable frequency may be a function other than the linear function. For example, the allowable frequency may be an exponential function of the elapsed time Ta. For example, when the determination reference time T_ref is updated, the control processor 106 calculates the allowable frequency on the basis of the determination reference time T_ref. Allowable frequency information indicating the allowable frequency is stored in the RAM 104.

The allowable frequency for the determination reference time T_ref may be the most frequent value in a histogram generated for updating the determination reference time. The limit value T_limit of the determination reference time may be the initial value T_ini of the determination reference time. Alternatively, the limit value T_limit of the determination reference time may be a time period which is set on the basis of a timing at which reception of image data of one frame should be completed. For example, the timing at which reception of image data of one frame should be completed is immediately before a timing at which a next vertical synchronization signal is generated in the image receiving terminal 100.

The same histogram as the histogram shown in FIGS. 8 and 9 is stored in the RAM 104. When the elapsed time for the specific packet is greater than the determination reference time, the control processor 106 updates the histogram. The control processor 106 extracts a frequency (an occurrence frequency corresponding to the measured elapsed time from the histogram. The control processor 106 calculates an allowable frequency for the measured elapsed time on the basis of allowable frequency information. The control processor 106 compares the frequency extracted from the histogram with the allowable frequency.

Figure 18:
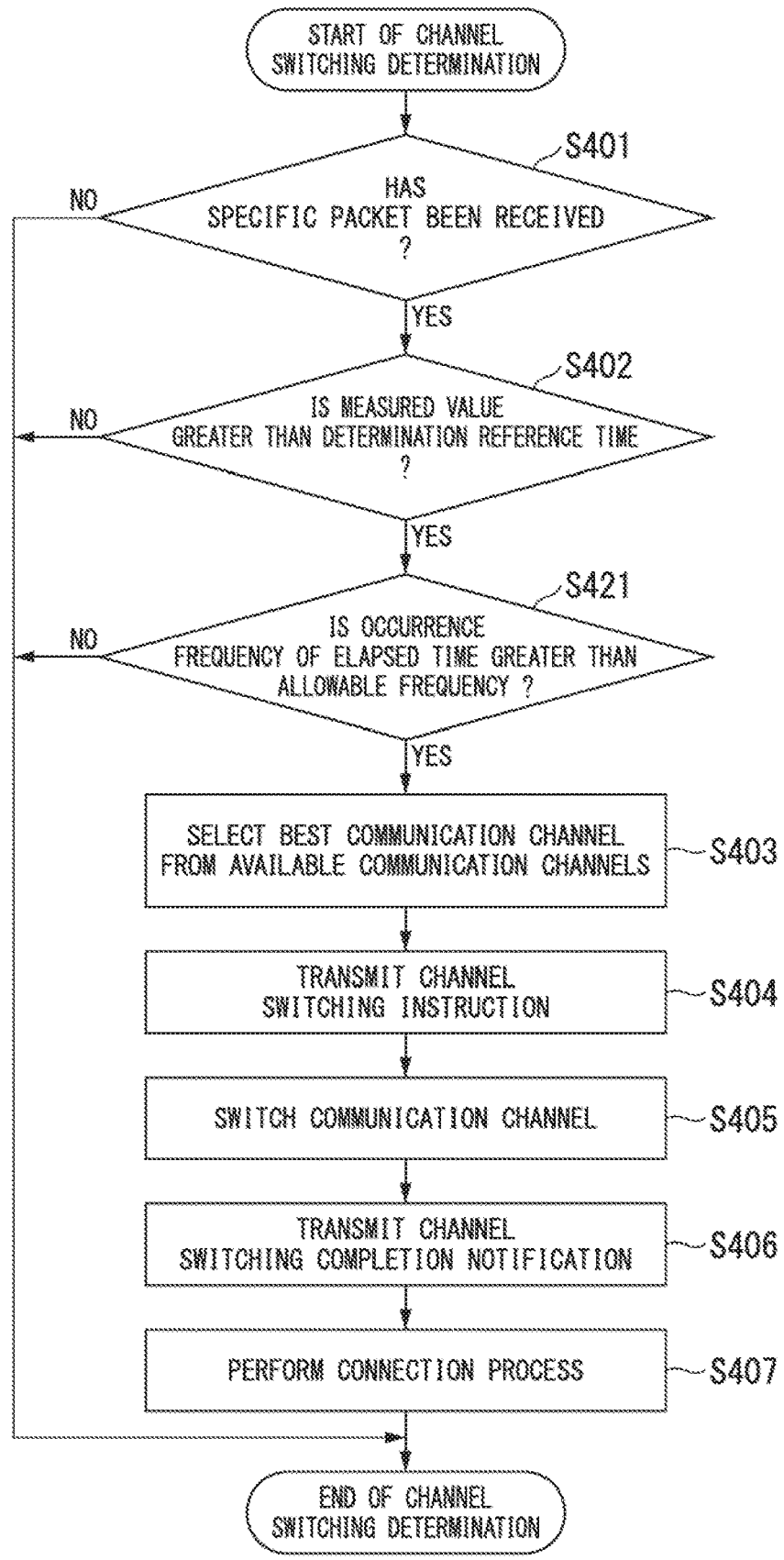
FIG. 18 is a flowchart showing a procedure of operations of an image receiving terminal according to a third embodiment of the present invention.

The operation of the image receiving terminal 100 will be described below with reference to FIG. 18. FIG. 18 shows a procedure of the channel switching determination (Step S303). A difference between the operation shown in FIG. 18 and the operation shown in FIG. 11 will be described.

When it is determined in Step S402 that the measured value of the elapsed time is greater than the determination reference time, the control processor 106 determines whether the occurrence frequency of the elapsed time is greater than the allowable frequency (Step S421).

When it is determined in Step S421 that the occurrence frequency of the elapsed time is equal to or less than the allowable frequency, the channel switching determination ends. When it is determined in Step S421 that the occurrence frequency of the elapsed time is greater than the allowable frequency, the control processor 106 determines that the communication channel which is used by the communicator 101 is to be switched. In this case, the process of Step S403 is performed.

Except for the above description, the operations shown in FIG. 18 are the same as the operations shown in FIG. 11.

In the third embodiment, it is possible to reduce a delay in reception of an image depending on a degree of deterioration of the wireless communication environment.

Fourth Embodiment

A fourth embodiment of the present invention will be described using the image receiving terminal 100 shown in FIG. 2 and the image transmitting terminal 200 shown in FIG. 3.

In the fourth embodiment, the specific packet is one of communication packets other than a final packet among a plurality of communication packets corresponding to an image of one frame. The final packet is a communication packet which is finally received among a plurality of communication packets corresponding to an image of one frame. Alternatively, the specific packet is the final packet.

Figure 19:
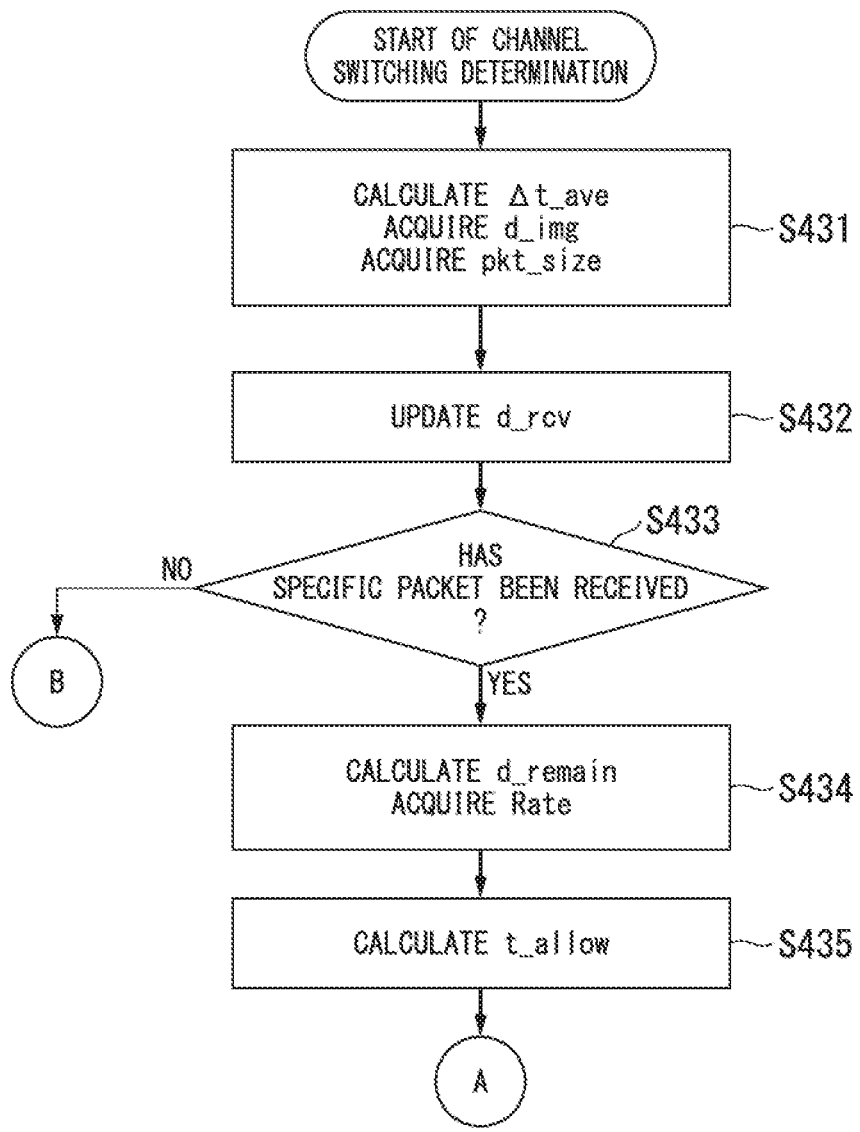
FIG. 19 is a flowchart showing a procedure of operations of an image receiving terminal according to a fourth embodiment of the present invention.
Figure 20:
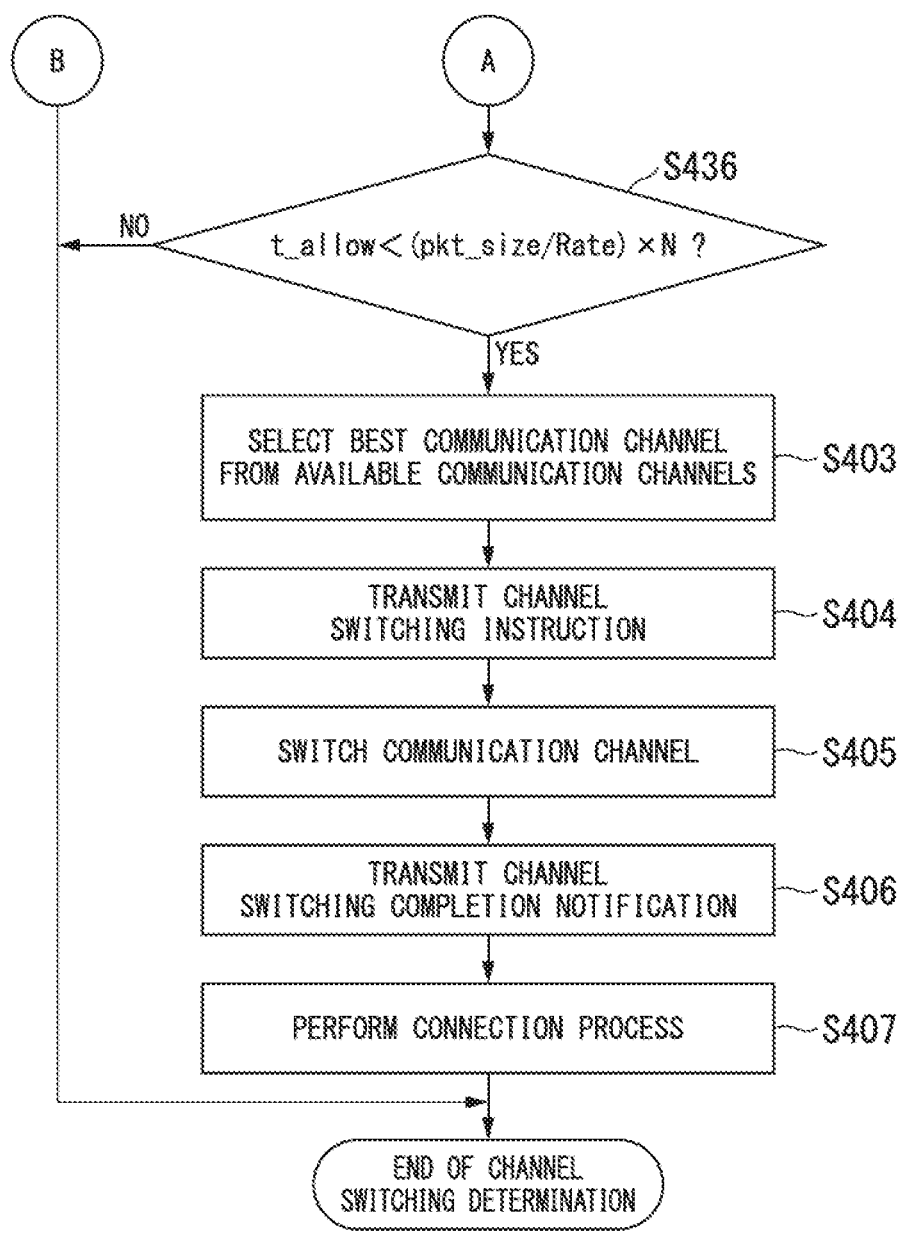
FIG. 20 is a flowchart showing a procedure of operations of the image receiving terminal according to the fourth embodiment of the present invention.

The operation of the image receiving terminal 100 will be described below with reference to FIGS. 19 and 20. FIGS. 19 and 20 show a procedure of the channel switching determination (Step S303). A difference between the operations shown in FIGS. 19 and 20 and the operations shown in FIG. 11 it be described below. In the operations shown in FIGS. 19 and 20, the specific packet is a communication packet other than the final packet.

The control processor 106 calculates an average value Δt_ave of reception intervals. The control processor 106 acquires a total data volume d_img and a data size pkt_size (Step S431). The average value Δt_ave of reception intervals is an average value of intervals at which a communication packet of divided image data is received. The communication packet of divided image data may be the specific packet. The average value Δt_ave of reception intervals is calculated on the basis of a reception interval between communication packets which have been received before the specific packet has been received in a frame in which determination associated with switching of a communication channel is performed. The total data volume d_img is a data volume of image data of one frame which is received in the frame in which determination associated with switching of a communication channel is performed. When the data volume of image data of one frame is not known, the maximum value of the size of compressed image data based on the Q value of the communication packet may be applied as the total data volume d_img. The data size pkt_size is a data volume of divided image data included in one communication packet.

Another statistical value for the reception intervals may be used instead of the average value Δt_ave of reception intervals. For example, a median value Δt_med in a histogram of the reception intervals may be used. A value may be used in which a standard deviation Δt_σ with respect to the average value Δt_ave of reception intervals or the median value Δt_med is reflected.

After Step S431, the control processor 106 updates a received data volume d_rcv (Step S432). The received data volume d_rcv is a sum of data volumes of divided image data included in the communication packets which are received in the frame in which determination associated with switching of a communication channel is performed.

Figure 21:
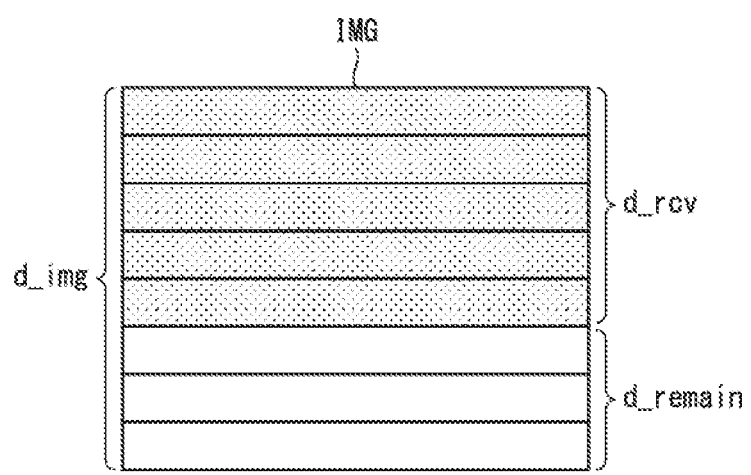
FIG. 21 is a reference diagram showing a sum of amounts of data, the amount of received data, and the amount of remaining data in the fourth embodiment of the present invention.

FIG. 21 shows the total data volume d_img, the received data volume d_rcv, and a remaining data volume d_remain. For the purpose of convenience of explanation, an image of one frame IMG includes eight lines. Image data of each line constitutes divided image data. The total data volume d_img is the data volumes of eight lines. At a time point at which divided image data of five lines is received, the received data volume d_rcv is a sum of data volumes of the divided image data of five lines. The remaining data volume d_remain is a data volume obtained by subtracting the received data volume d_rcv from the total data volume d_img. That is, the remaining data volume d_remain is a sum of data volumes of divided image data which is not yet received by the communicator 101.

After the received data volume d_rcv has been updated, the control processor 106 determines whether the specific packet has been received. That is, the control processor 106 determines whether the communication packet received in Step S302 immediately before the channel switching determination is the specific packet (Step S433). When the control processor 106 determines that the communication packet is not the specific packet in Step S433, the channel switching determination ends.

When the control processor 106 determines that the communication packet is the specific packet in Step S433, the control processor 106 calculates the remaining data volume d_remain and acquires a communication rate Rate (Step S434). The remaining data volume d_remain is calculated by Equation (1).

$$d\_remain = d\_img - d\_rcv \quad (1)$$

The communication rate Rate is a communication rate when the specific packet is received. A PHY rate of a wireless LAN may be used as the communication rate. An actual reception throughput ay be used as the communication rate. An average value of reception throughputs of a plurality of communication packets as well as the throughput of the specific packet may be used as the communication rate. For example, a calculation range of the average value is one frame. That is, the average value of the reception throughputs of a plurality of communication packets corresponding to an image of one frame is calculated. The calculation range of the average value may be a plurality of frames. For example, the calculation range of the average value may be flames included within 10 seconds. That is, when 60 frames constitute one second, the calculation range of the average value may be 600 frames.

After Step S434, the control processor 106 calculates an allowable time t_allow (Step S435). The allowable time t_allow is an allowable value of a time period required for receiving of each communication packet which is received after the specific packet. In Step S435, the control processor 105 calculates the number of communication packets required for reception of divided image data which is not yet received by dividing the remaining data volume d_remain by the data size pkt_size. In Step S435, the control processor 106 calculates an allowable reception time of one communication packet by dividing a remaining time t_remain by the number of communication packets. The remaining time t_remain is a remaining time in one frame. In Step S435, the control processor 105 calculates the allowable time t_allow by subtracting the average value Δt_ave of reception intervals from the allowable reception time. That is, the control processor 105 calculates the allowable time t_allow using Equation (2).

$$t\_allow = t\_remain/(d\_remain/pkt\_size) 31\ \Delta t\_ave \quad (2)$$

Figure 22:
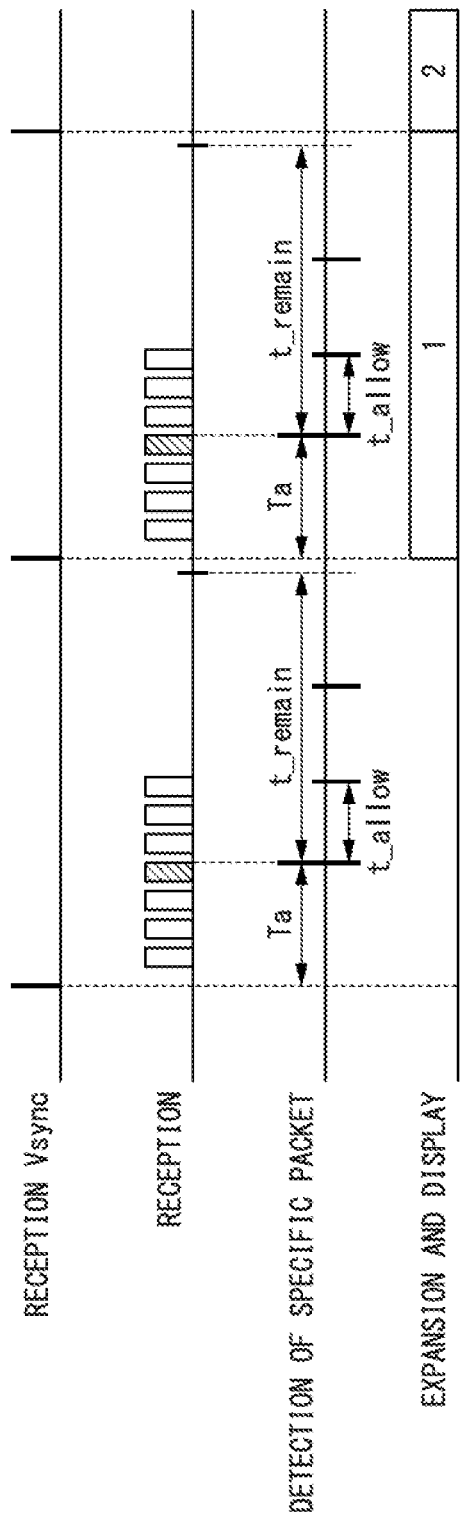
FIG. 22 is a timing chart showing schematic operations of the image receiving terminal according to the fourth embodiment of the present invention.

FIG. 22 shows schematic operations of the image receiving terminal 100. The horizontal axis in FIG. 22 represents time. In FIG. 22, "reception Vsync," "reception," "detection of specific packet," and "expansion and display" are shown. These items are the same as the items shown in FIG. 5. In FIG. 22, the elapsed time Ta, the remaining time t_remain, and the allowable time t_allow are shown. In FIG. 22, the specific packet is a communication packet which is fourth received among a plurality of communication packets corresponding to an image of one frame. The remaining time t_remain is a time period from a time point at which the specific packet is received to a time point at which an expansion process is performed. In one frame, three communication packets are received after the specific packet. The allowable time t_allow is close to a time period obtained by dividing the remaining time t_remain by three.

In Equation (2), the allowable time t_allow is based on a value obtained by dividing the remaining time t_remain by the number of communication packets. The allowable time t_allow is not limited thereto. For example, the remaining time t_remain may be allocated such that a longer time can be secured for a communication packet closer to the final packet.

After Step S435, the control processor 106 determines whether Equation (3) is satisfied. In Equation (3), N indicates a preset retransmission frequency. Equation (3) represents that the time which is estimated to be necessary for reception when a communication packet including divided image data is transmitted at the communication rate Rate is longer than the allowable time t_allow. The data size of the divided image data is pkt_size. Accordingly, the control processor 106 determines whether reception of a determination target packet is completed before a display image is displayed on the monitor 105 (Step S436). The determination target packet is a communication packet which is received by the communicator 101 after the specific packet has been received.

$$t\_allow < (pkt\_size/Rate) \times N \quad (3)$$

When it is determined in Step S436 that Equation (3) has not been satisfied, reception of the determination target packet is completed before a display image is displayed on the monitor 105. In this case, the control processor 106 determines that the communication channel which is used by the communicator 101 is not to be switched, and the channel switching determination ends. When it is determined in Step S436 that Equation (3) has been satisfied, it is estimated that reception of the determination target packet is not completed before a display image is displayed on the monitor 105. In this case, the process of Step S403 is performed.

Except for the above description, the operations shown in FIGS. 19 and 20 are the same as the operations shown in FIG. 11.

A plurality of specific packets may be present in one frame. That is, When a plurality of specific packets have been received in one frame, the control processor 106 may determine whether reception of the determination target packet is completed before a display image is displayed on the monitor 105.

As described above, the specific packet is one of communication packets other than the final packet among a plurality of communication packets corresponding to an image of one frame. When the specific packet has been received by the communicator 101, the processor 102 calculates a sum of data volumes (d_remain) of divided images which are not yet received by the communicator 101 among the divided images corresponding to an image of one frame (Step S434). The processor 102 determines whether reception of the determination target packet is completed before a display image is displayed on the monitor 105 on the basis of the sum of data volumes (d_remain) of the divided images and the communication rate (Rate) of the communicator 101 (Step S436). The determination target packet is a communication packet which is received by the communicator 101 after the specific packet has been received. When the processor 102 determines that reception of the determination target packet is not completed before a display image is displayed on the monitor 105, the processor 102 determines that the communication channel which is used by the communicator 101 is to be switched to another communication channel (Step S436).

Steps (S431, S432, S434, and S435) of acquiring information which is used for the processor 102 to perform determination are an example. The processor 102 may acquire the information using a method other than the above-mentioned method.

Figure 23:
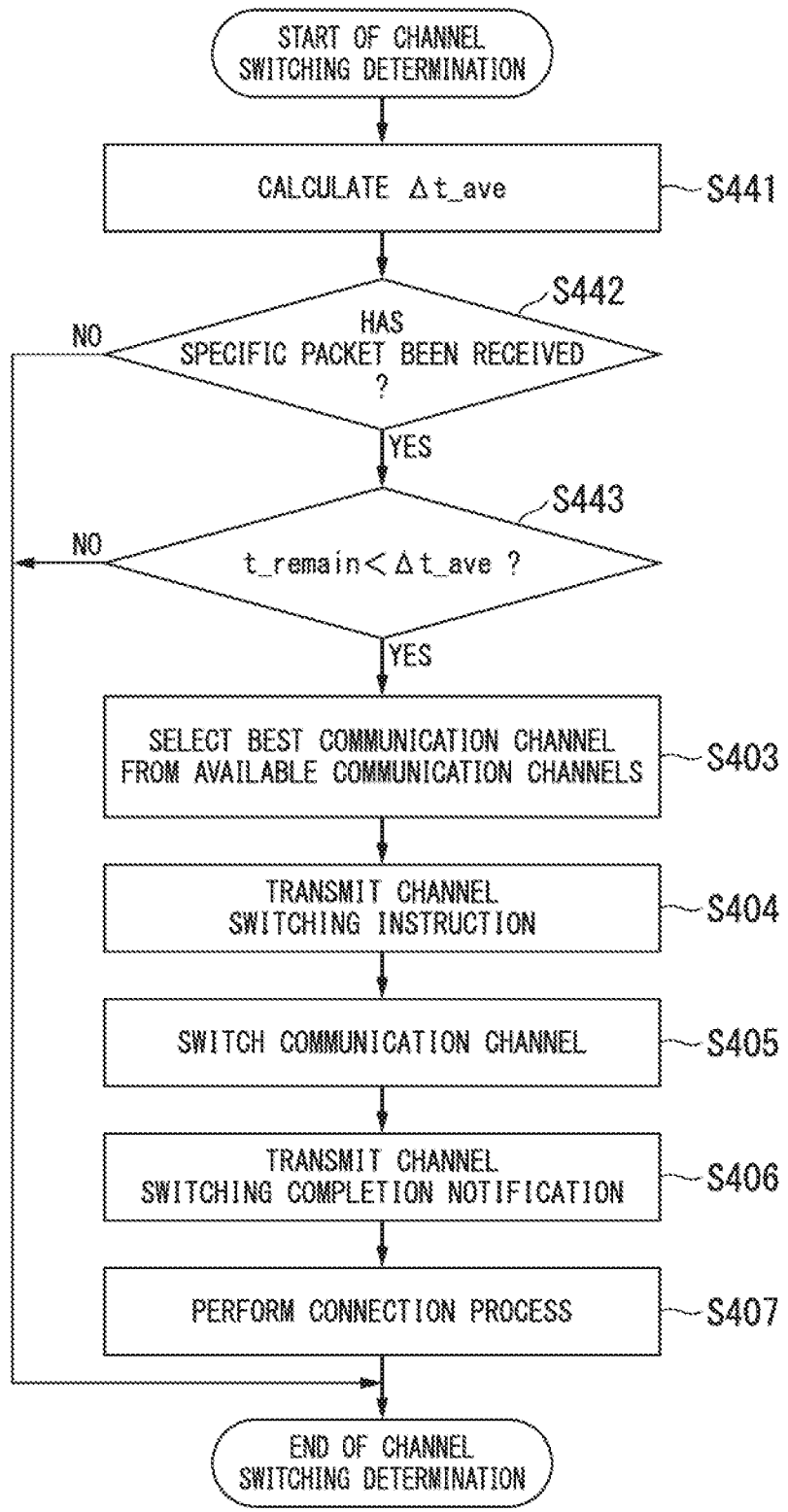
FIG. 23 is a flowchart showing a procedure of operations of the image receiving terminal according to the fourth embodiment of the present invention.

Other operation of the image receiving terminal 100 will be described below with reference to FIG. 23. FIG. 23 shows a procedure of channel switching determination (Step S303). A difference between the operations shown in FIG. 23 and the operations shown in FIG. 11 will be described below. In the operation shown in FIG. 23, the specific packet is a final packet.

The control processor 106 calculates an average value $\Delta t\_ave$ of reception intervals (Step S441). The method of calculating the average value $\Delta t\_ave$ of reception intervals is the same as the method used in Step S431 shown in FIG. 20. As described above, another statistical value for the reception intervals may be used instead of the average value $\Delta t\_ave$ of reception intervals.

After the average value $\Delta t\_ave$ of reception intervals has been calculated, the control processor 106 determines whether the specific packet has been received. That is, the control processor 106 determines whether the communication packet received in Step S302 immediately before the channel switching determination is the specific packet (Step S442). When the control processor 106 determines that the communication packet is not the specific packet in Step S442, the channel switching determination ends.

When the control processor 106 determines that the communication packet is the specific packet in Step S442, the control processor 106 determines whether the remaining time t_remain is less than the average value $\Delta t\_ave$ of reception intervals (Step S443). When the control processor 106 determines that the remaining time t_remain is less than the average value $\Delta t\_ave$ of reception intervals in Step S443, the process of Step S403 is performed. When the control processor 106 determines that the remaining time t_remain is equal to or greater than the average value $\Delta t\_ave$ of reception intervals in Step S443, the channel switching determination ends.

Except for the above description, the operations shown in FIG. 23 are the same as the operations shown in FIG. 11.

As described above, the specific packet is the final packet. The processor 102 measures the reception interval ($\Delta t\_ave$) of the communication packets received before the specific packet has been received (Step S441). The processor 102 determines whether the remaining time (t_remain) in one frame when the specific packet has been received is shorter than the reception interval between the communication packets (Step S443). When the remaining time in one frame is shorter than the reception interval between the communication packets, the processor 102 determines that the communication channel which is used by the communicator 101 is to be switched to another communication channel (Step 443).

The operations shown in FIGS. 20 and 21 and the operations shown in FIG. 23 may be combined. In this case, a plurality of communication packets including the final packet among a plurality of communication packets corresponding to an image of one frame are the specific packets. When a specific packet other than the final packet has been received, the determination of Step S436 is performed. When the final packet has been received, the determination of Step S443 is performed.

In the first to fourth embodiments, the specific packet can be set arbitrarily in one frame. When each specific packet has been received, determination of the wireless communication environment is performed. Accordingly, it is possible to detect deterioration of the wireless communication environment at any timing in one frame. However, in the first to third embodiments, the elapsed time varies depending on the position of the specific packet in a plurality of communication packets. When two or more specific packets are set in one frame, it is necessary to acquire statistical information of the elapsed time for each specific packet. Accordingly, a processing load is large.

On the other hand, information acquired for determination of the wireless communication environment in the fourth embodiment can be commonly used for determination for the specific packets regardless of the position of the specific packet. Accordingly, an increase in the processing load is curbed. Accordingly, when two or more specific packets are set in one frame, it is possible to curb an increase in the processing load and to secure real-time characteristics in transmission of an image.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image receiving terminal comprising:
   a communicator configured to receive communication packets from an image transmitting terminal using a wireless communication channel; and
   one or more processors,
   wherein an image of one frame is divided into one or more images and each communication packet includes the divided image,
   the image of one frame corresponds to a plurality of communication packets,
   the processor is configured to generate a display image of one frame from the divided images included in the plurality of communication packets received by the communicator,
   the processor is configured to generate a vertical synchronization signal on the basis of a clock,
   the processor is configured to output the display image to a monitor in synchronization with the vertical synchronization signal, the processor is configured to measure a plurality of elapsed times by measuring an elapsed time each time the vertical synchronization signal is generated, each elapsed time included in the plurality of elapsed times being a time period from a time point at which the vertical synchronization signal is generated to a time point at which a specific packet is received by the communicator, and the specific packet being one of the plurality of communication packets corresponding to the image of one frame, the processor is configured to set a determination reference time on the basis of the plurality of measured elapsed times, the processor is configured to determine whether the communication channel which is used by the communicator is to be switched to another communication channel on the basis of the set determination reference time and the elapsed time measured after the determination reference time has been set, and the processor is configured to control switching of the communication channel which is used by the communicator on the basis of the result of determination of the communication channel.

2. The image receiving terminal according to claim 1, wherein the processor is configured to determine that the communication channel which is used by the communicator is to be switched to another communication channel when the plurality of elapsed times measured after the determination reference time has been set are continuously greater than the determination reference time.

3. The image receiving terminal according to claim 1, wherein the processor is configured to set a time period based on the longest elapsed time among the plurality of measured elapsed times as the determination reference time.

4. The image receiving terminal according to claim 1, wherein the processor is configured to set a time period based on the elapsed time with the highest occurrence frequency among the plurality of measured elapsed times as the determination reference time.

5. The image receiving terminal according to claim 1, wherein an allowable frequency is set in advance for each elapsed time included in the plurality of elapsed times longer than the determination reference time, the allowable frequency becomes smaller as the elapsed time becomes longer than the determination reference time, and the processor is configured to determine that the communication channel which is used by the communicator is to be switched to another communication channel when the elapsed time measured after the determination reference time has been set is longer than the determination reference time and an occurrence frequency of the measured elapsed time is higher than the allowable frequency for the measured elapsed time.

6. The image receiving terminal according to claim 1, wherein the specific packet is one of the communication packets other than a final packet among the plurality of communication packets corresponding to the image of one frame, the final packet is a communication packet which is received finally among the plurality of communication packets corresponding to the image of one frame, the processor is configured to calculate a total data volume of the divided images which have not been received by the communicator yet among the divided images corresponding to the image of one frame when the specific packet has been received by the communicator, the processor is configured to determine whether reception of a determination target packet is completed before the display image is displayed on the monitor on the basis of the total data volume and a communication rate of the communicator, the determination target packet being the communication packet which is received by the communicator after the specific packet has been received, and the processor is configured to determine that the communication channel which is used by the communicator is to be switched to another communication channel when the processor determines that reception of the determination target packet is completed before the display image is displayed on the monitor.

7. The image receiving terminal according to claim 1, wherein the specific packet is a final packet, the final packet is a communication packet which is received finally among the plurality of communication packets corresponding to the image of one frame, the processor is configured to measure a reception interval between the, communication packets which are received before the specific packet has been received, the processor is configured to determine whether a remaining time in one frame when the specific packet has been received is shorter that the reception interval, and the processor is configured to determine that the communication channel which is used by the communicator is to be switched to another communication channel when the remaining time is shorter than the reception interval.

8. An image communication system comprising,:
an image receiving terminal; and
an image transmitting terminal,
wherein the image receiving terminal includes:
a first communicator configured to receive communication packets from the image transmitting terminal using a wireless communication channel: and
one or more first processors,
an image of one frame is divided into one or more images and each communication packet includes the divided image,
the image of one frame corresponds to a plurality of communication packets,
the first processor is configured to generate a display image of one frame from the divided images included in the plurality of communication packets received by the first communicator,
the first processor is configured to generate a vertical synchronization signal on the basis of a clock,
the first processor is configured to output the display image to a monitor in synchronization with the vertical synchronization signal,
the first processor is configured to measure a plurality of elapsed times by measuring an elapsed time each time the vertical synchronization signal is generated, each elapsed time included in the plurality of elapsed times being a time period from a time point at which the vertical synchronization signal is generated to a time point at which a specific packet is received by the first communicator, and the specific packet being one of the plurality of communication packets corresponding to the image of one frame,
the first processor is configured to set a determination reference time on the basis of the plurality of measured elapsed times, the first processor is configured to determine whether the communication channel which is used by the first communicator is to be switched to another communication channel on the basis of the set determination reference time and the elapsed time measured after the determination reference time has been set, the first processor is configured to control switching of the communication channel which is used by the first communicator on the basis of the result of determination of the communication channel, and the image transmitting terminal includes:
- an imaging device configured to perform imaging every imaging cycle and output the image of one frame every imaging cycle;
- a second processor configured to generate the communication packet including the divided image included in the image of one frame; and
- a second communicator configured to transmit the communication packets to the image receiving terminal using the communication channel.

9. An image receiving method comprising:
a first step of causing an image receiving terminal to receive communication packets from an image transmitting terminal using a wireless communication channel by a communicator, image of one frame being divided into one or more images, each communication packet including the divided image, the image of one frame corresponding to a plurality of communication packets;
a second step of causing the image receiving terminal to generate a display image of one frame from the divided images included in the plurality of communication packets received by the communicator,
a third step of causing the image receiving terminal to output the display image to a monitor in synchronization with a vertical synchronization signal, the vertical synchronization signal being generated on the basis of a clock,
a fourth step of causing the image receiving terminal to measure a plurality of elapsed times by measuring an elapsed time each time the vertical synchronization signal is generated, each elapsed time included in the plurality of elapsed times being a time period from a time point at which the vertical synchronization signal is generated to a time point at which a specific packet is received by the communicator; the specific packet being one of the plurality of communication packets corresponding to the image of one frame;
a fifth step of causing the image receiving terminal to set a determination reference time on the basis of the plurality of measured elapsed times;
a sixth step of causing the image receiving terminal to determine whether the communication channel which is used by the communicator is to be switched to another communication channel on the basis of the set determination reference time and the elapsed time measured alter the determination reference time has been set; and
a seventh step of causing the image receiving terminal to control switching of the communication channel which is used by the communicator on the basis of the result of determination of the communication channel.

10. A non-transitory computer-readable recording medium having a program recorded thereon, the program causing a computer to perform:
a first step of receiving communication packets from an image transmitting terminal using a wireless communication channel by a communicator; an image of one frame being divided into one or more images, each communication packet including the divided image, the image of one frame corresponding to a plurality of communication packets;
a second step of generating a display image of one frame from the divided images included in the plurality of communication packets received by the communicator;
a third step of outputting the display image to a monitor in synchronization with a vertical synchronization signal, the vertical synchronization signal being generated on the basis of a clock,
a fourth step of measuring a plurality of elapsed times by measuring an elapsed time each time the vertical synchronization signal is generated, each elapsed time included in the plurality of elapsed times being a time period from a time point at which the vertical synchronization signal is generated to a time point at which a specific packet is received by the communicator, the specific packet being one of the plurality of communication packets corresponding to the image of one frame;
a fifth step of setting a determination reference time on the basis of the plurality of measured elapsed times;
a sixth step of determining whether the communication channel which is used by the communicator is to be switched to another communication channel on the basis of the set determination reference time and the elapsed time measured after the determination reference time has been set; and
a seventh step of controlling switching of the communication channel which is used by the communicator on the basis of the result of determination of the communication channel.

* * * * *